US012563324B2

(12) United States Patent
Wan et al.

(10) Patent No.: US 12,563,324 B2
(45) Date of Patent: Feb. 24, 2026

(54) SPLITTING APPARATUS, DUAL-MODE ONU, OPTICAL NETWORK SYSTEM, AND COMMUNICATION METHOD

(71) Applicant: HUAWEI TECHNOLOGIES CO., LTD., Guangdong (CN)

(72) Inventors: Junqiao Wan, Shenzhen (CN); Jun Zhang, Dongguan (CN); Liangwen Xie, Johannesburg (ZA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/352,302

(22) Filed: Jul. 14, 2023

(65) Prior Publication Data

US 2023/0362522 A1      Nov. 9, 2023

Related U.S. Application Data

(63) Continuation of application No. PCT/CN2021/125364, filed on Oct. 21, 2021.

(30) Foreign Application Priority Data

Jan. 14, 2021    (CN) .......................... 202110048894.1

(51) Int. Cl.
| | |
|---|---|
| *H04Q 11/00* | (2006.01) |
| *H04B 10/032* | (2013.01) |
| *H04B 10/278* | (2013.01) |

(52) U.S. Cl.
CPC ....... *H04Q 11/0067* (2013.01); *H04B 10/032* (2013.01); *H04B 10/278* (2013.01); *H04Q 2011/0081* (2013.01)

(58) Field of Classification Search
None
See application file for complete search history.

(56) References Cited

U.S. PATENT DOCUMENTS

| | | | | |
|---|---|---|---|---|
| 6,327,400 | B1 * | 12/2001 | Harstead .............. | H04B 10/275 |
| | | | | 385/16 |
| 6,681,083 | B1 * | 1/2004 | Koonen .............. | H04J 14/0221 |
| | | | | 398/171 |
| 8,301,867 | B1 * | 10/2012 | Mazuk ................ | G06F 11/2005 |
| | | | | 712/36 |
| 8,428,456 | B2 * | 4/2013 | Zheng ................. | H04J 14/0287 |
| | | | | 398/5 |
| 9,130,676 | B2 * | 9/2015 | Mangin ................. | H04B 10/27 |

(Continued)

FOREIGN PATENT DOCUMENTS

| | | |
|---|---|---|
| CN | 1889405 A | 1/2007 |
| WO | 2004030243 A1 | 4/2004 |

*Primary Examiner* — Jai M Lee

(57) ABSTRACT

A splitting apparatus provides M groups of ports and includes M splitting elements. Each splitting element includes at least one feeder end and N branch ends, where M=N+1. Each branch end of each splitting element is coupled to one branch end of another splitting element in the M splitting elements, where different branch ends of each splitting element are coupled to one branch end of different splitting elements. A feeder end of each splitting element is coupled to one group of ports in the M groups of ports of the splitting apparatus, and feeder ends of different splitting elements are coupled to different groups of ports. The splitting apparatus may implement an optical bus structure with peer-to-peer topologies.

9 Claims, 10 Drawing Sheets

(56)        References Cited

U.S. PATENT DOCUMENTS

| 9,319,758 | B2 * | 4/2016 | Goswami | H04Q 11/0067 |
| 11,936,432 | B2 * | 3/2024 | Hatano | H04B 10/272 |
| 2001/0026384 | A1 * | 10/2001 | Sakano | H04Q 11/0066 |
| | | | | 398/79 |
| 2005/0019031 | A1 * | 1/2005 | Ye | H04B 10/077 |
| | | | | 398/19 |
| 2010/0322626 | A1 * | 12/2010 | Kim | H04J 14/0252 |
| | | | | 398/63 |
| 2015/0288444 | A1 * | 10/2015 | Pu | H04Q 11/0067 |
| | | | | 398/5 |

* cited by examiner (a)                   (b)

a1-2
Port 2

1:4
splitter
2 b4-2     b1-2
b3-2   b2-2 b1-1               b4-3
Port 1     1:4    b2-1              b3-3     1:4    Port 3
a1-1    splitter                    splitter   a1-3
      #1    b3-1              b2-3     #3
         b4-1               b1-3 b1-5                 b4-4
b2-5             b3-4
b3-5         b2-4
1:4     b4-5   b1-4    1:4
splitter                 splitter
5                     #4

Port 5                       Port 4
a1-5                        a1-4

SPLITTING APPARATUS, DUAL-MODE ONU, OPTICAL NETWORK SYSTEM, AND COMMUNICATION METHOD

CROSS-REFERENCE TO RELATED APPLICATIONS

This application is a continuation of International Application No. PCT/CN2021/125364 filed on Oct. 21, 2021, which claims priority to Chinese Patent Application No. 202110048894.1 filed on Jan. 14, 2021. The disclosures of the aforementioned applications are hereby incorporated by reference in their entireties.

TECHNICAL FIELD

This disclosure relates to the field of optical network technologies, and in particular, to a splitting apparatus, a dual-mode optical network unit (ONU), an optical network system, and a communication method.

BACKGROUND

In a passive optical network (PON) system, an optical line terminal (OLT) is connected to a splitter by using a feeder fiber, and an ONU is connected to the splitter by using a branch fiber, so that a point-to-multipoint (point to multipoint) connection from the OLT to the ONU is implemented. The ONU is connected to a terminal device by using an Ethernet interface.

In the PON system, a PON port of the OLT may be connected to up to 128 ONUs in a flexible extension manner by using the splitter. The ONU provides a connection service for determining a delay for access of the terminal device in a time division multiplex (time division multiplex, TDM) manner by using a dynamical bandwidth assignment (DBA) mechanism.

FIG. 1 shows an example of a splitter with a split ratio of 1:N. The splitter includes one input end and N output ends. The input end of the splitter is connected to the PON port of the OLT by using the feeder fiber, and each output end of the splitter is connected to one ONU by using the branch fiber. As shown in the figure, one output end of the splitter is connected to an ONU-1 by using a branch fiber-1, another output end is connected to an ONU-2 by using a branch fiber-2, and so on.

There is an optical signal channel between the OLT and the ONU, and there is no optical signal channel between ONUs on the splitter. Communication between the ONUs needs to be switched on the OLT or on an upper-layer device; in other words, an optical signal channel between output ends of the splitter is not peer-to-peer to an optical signal channel between the output end and the input end.

SUMMARY

This disclosure provides a splitting apparatus, a dual-mode ONU, an optical network system, and a communication method, to implement optical transmission based on an optical bus structure with peer-to-peer topologies.

According to a first aspect, a splitting apparatus includes M groups of ports and M splitting elements. The splitting elements include at least one feeder end and N branch ends, where M=N+1. Each branch end of each splitting element is coupled to one branch end of another splitting element in the M splitting elements. Different branch ends of each splitting element are coupled to one branch end of different splitting elements. A feeder end of each splitting element is coupled to one group of ports in the M groups of ports of the splitting apparatus, and feeder ends of different splitting elements are coupled to different groups of ports.

In the foregoing splitting apparatus, branch ends of N+1 (that is, M) splitting elements that have N branch ends (or referred to as N outputs) are interconnected, and optical channels between any two groups of ports are peer-to-peer, so that an optical bus structure with (N+1) peer-to-peer topologies is formed. When the foregoing splitting apparatus is used for PON networking, based on the optical bus structure with peer-to-peer topologies, each port of the splitting apparatus may be connected to an OLT by using a feeder fiber, or may be connected to an ONU by using a branch fiber. For example, a port in any port group may be connected to the OLT, and a port in another port group may be connected to the ONU, to transmit an optical signal between the OLT and each ONU.

In an implementation, the M splitting elements are M splitters with a split ratio of 1:N, to form an optical bus structure with $1\times(N+1)$ peer-to-peer topologies; the M splitting elements are M splitters with a split ratio of 2:N, to form an optical bus structure with $2\times(N+1)$ peer-to-peer topologies, so that higher reliability than that of the optical bus structure with $1\times(N+1)$ peer-to-peer topologies can be achieved; or the M splitting elements include X splitters with a split ratio of 1:N and Y splitters with a split ratio of 2:N, where X+Y=M, and both X and Y are integers greater than or equal to 1, to form an optical bus structure with hybrid (N+1) peer-to-peer topologies. In the foregoing implementation, all the splitting elements are implemented by using a splitter with a unified split ratio, so that technical implementation is simplified.

In an implementation, the M splitting elements include at least one first splitting element, the first splitting element includes K feeder ends, a group of ports coupled to the first splitting element includes K ports, the K feeder ends are respectively coupled to the K ports, and K is a positive integer less than or equal to 2.

In an implementation, N=2m, and m is an integer greater than 1.

According to a second aspect, an optical network system is provided that includes a splitting apparatus and at least two optical communication devices, the optical communication device being a device that performs communication by using an optical signal.

The splitting apparatus includes M groups of ports and M splitting elements, and the splitting element includes at least one feeder end and N branch ends, where M=N+1. Each branch end of each splitting element is coupled to one branch end of another splitting element in the M splitting elements, and different branch ends of each splitting element are coupled to one branch end of different splitting elements. A feeder end of each splitting element is coupled to one group of ports in the M groups of ports of the splitting apparatus, and feeder ends of different splitting elements are coupled to different groups of ports.

Each optical communication device is connected to one group of ports in the M groups of ports of the splitting apparatus by using a fiber.

In the foregoing splitting apparatus, optical transmission based on an optical bus structure with peer-to-peer topologies can be implemented.

In an implementation, the optical communication device includes at least one OLT and at least one ONU. The OLT and each ONU are separately connected to one group of ports in the M groups of ports of the splitting apparatus by using a fiber. Based on the optical bus structure with peer-to-peer topologies of the splitting apparatus, when a fiber connected to the OLT is disconnected or the OLT is faulty, an ONU connected to another port of the splitting apparatus may be replaced with the OLT, so that optical signal transmission between the OLT and a remaining ONU can be ensured, to improve reliability.

In an implementation, the optical communication device includes one OLT, the OLT includes a first PON port and a second PON port, the first PON port is connected to a first port of the splitting apparatus by using a first fiber, the second PON port is connected to a second port of the splitting apparatus by using a second fiber, and the first port and the second port are ports in a same port group, to form TypeB protection to improve reliability.

In an implementation, the optical communication device includes a first OLT and a second OLT, the first OLT is connected to a first port of the splitting apparatus by using a first fiber, the second OLT is connected to a second port of the splitting apparatus by using a second fiber, and the first port and the second port are ports in a same port group, to form TypeB protection to improve reliability.

In an implementation, the at least two ONUs include at least one dual-mode ONU, and the dual-mode ONU operates in one of an ONU mode and an OLT mode. The dual-mode ONU operating in the ONU mode is configured to receive an optical signal of a first wavelength and send an optical signal of a second wavelength. The dual-mode ONU operating in the OLT mode is configured to send the optical signal of the first wavelength and receive the optical signal of the second wavelength. When the dual-mode ONU operates in the ONU mode, if duration in which the dual-mode ONU does not receive the optical signal of the first wavelength is greater than or equal to specified duration, the dual-mode ONU switches to the OLT mode.

The first wavelength is a downlink wavelength, such as 1490 nm, and the second wavelength is an uplink wavelength, such as 1310 nm.

In the foregoing implementation, if the dual-mode ONU operating in the ONU mode does not receive the optical signal of the first wavelength in a relatively long time (in other words, duration in which the optical signal of the first wavelength is not received is greater than or equal to specified duration), it indicates that a fiber connected to the OLT is disconnected or the OLT is faulty. In this case, the ONU cannot communicate with the OLT by using the splitting apparatus, and the dual-mode ONU may automatically switch to the OLT mode, so that optical signal transmission between the dual-mode ONU operating in the OLT mode and a remaining ONU can be ensured, to improve reliability.

In an implementation, the dual-mode ONU includes:

an ONU module, configured to receive the optical signal of the first wavelength and send the optical signal of the second wavelength;

an OLT module, configured to send the optical signal of the first wavelength and receive the optical signal of the second wavelength; and a switching control unit, configured to control the dual-mode ONU to operate in one of the ONU mode and the OLT mode, where when the dual-mode ONU operates in the ONU mode, if it is detected that duration in which the ONU module does not receive the optical signal of the first wavelength is greater than or equal to the specified duration, light emission of the OLT module is enabled, light emission of the ONU module is disabled, and light reception of the ONU module is maintained, so that the dual-mode ONU switches to the OLT mode.

In an implementation, the switching control unit is configured to: when the dual-mode ONU operates in the OLT mode, if the ONU module receives the optical signal of the first wavelength, disable light emission of the OLT module and enable light emission of the ONU module, so that the dual-mode ONU switches to the ONU mode.

In the foregoing implementation, when the dual-mode ONU operating in the OLT mode receives the optical signal of the first wavelength, because the first wavelength is a downlink wavelength (that is, an optical signal wavelength in a transmit direction of the OLT), it indicates that the OLT has recovered a connection to the splitting apparatus, and therefore the dual-mode ONU switches to the ONU mode, to ensure normal transmission of the optical signal.

In a possible implementation, a PON port of the ONU module is connected to the first port of the splitting apparatus by using a first fiber, a PON port of the OLT module is connected to the second port of the splitting apparatus by using a second fiber, and the first port and the second port are ports in a same port group.

In an implementation, the dual-mode ONU further includes:

an Ethernet switching unit;

a first encapsulation processing unit coupled between the ONU module and the Ethernet switching unit, configured to: process a passive optical network PON data frame from the ONU module into an Ethernet frame and send the Ethernet frame to the Ethernet switching unit, and/or process an Ethernet frame from the Ethernet switching unit into a PON data frame and send the PON data frame to the ONU module; and a second encapsulation processing unit coupled between the OLT module and the Ethernet switching unit, configured to: process a passive optical network PON data frame from the OLT module into an Ethernet frame and send the Ethernet frame to the Ethernet switching unit, and/or process an Ethernet frame from the Ethernet switching unit into a PON data frame and send the PON data frame to the OLT module.

In an implementation, the at least one ONU further includes a first ONU and a second ONU, the first ONU is connected to an audio and video collection device, and the second ONU is connected to a storage device. If the duration in which the dual-mode ONU does not receive the optical signal of the first wavelength is greater than or equal to the specified duration, the dual-mode ONU switches to an OLT operating mode.

The dual-mode ONU operating in the OLT mode is configured to:

receive the optical signal that is of the second wavelength and that is sent by the first ONU, where the optical signal of the second wavelength carries audio and video data sent to the storage device, and the audio and video data is collected by the audio and video collection device connected to the first ONU;

convert the optical signal of the second wavelength into the optical signal of the first wavelength; and send the optical signal of the first wavelength to the splitting apparatus, so that the optical signal of the first wavelength is received by the second ONU, and the second ONU sends the audio and video data carried by the optical signal of the first wavelength to the storage device.

In the foregoing implementation, because the splitting apparatus is connected to a dual-mode ONU, when a connection between the OLT and the splitting apparatus is faulty, the dual-mode ONU does not receive the optical signal of the first wavelength in a relatively long time, and therefore the dual-mode ONU switches to the OLT mode to implement an OLT function. In this way, the first ONU and the second ONU can communicate with each other by using the dual-mode ONU operating in the OLT mode, and the audio and video data collected by the audio and video collection device connected to the first ONU is transmitted to the storage device connected to the second ONU, to ensure security of storage of the audio and video data.

In an implementation, the at least one optical network unit ONU further includes a first ONU and a second ONU, the first ONU is connected to a first wireless local area network access device, and the second ONU is connected to a second wireless local area network access device. If the duration in which the dual-mode ONU does not receive the optical signal of the first wavelength is greater than or equal to the specified duration, the dual-mode ONU switches to an OLT operating mode.

The dual-mode ONU operating in the OLT mode is configured to:

receive the optical signal that is of the second wavelength and that is sent by the first ONU, where the optical signal of the second wavelength carries communication data sent to a terminal connected to the second wireless local area network access device, and the communication data is sent by a terminal connected to the first wireless local area network access device connected to the first ONU;

convert the optical signal of the second wavelength into the optical signal of the first wavelength; and send the optical signal of the first wavelength to the splitting apparatus, so that the optical signal of the first wavelength is received by the second ONU, and the second ONU sends the communication data carried by the optical signal of the first wavelength to the terminal connected to the second wireless local area network access device.

In the foregoing implementation, because the splitting apparatus is connected to a dual-mode ONU, when a connection between the OLT and the splitting apparatus is faulty, the dual-mode ONU does not receive the optical signal of the first wavelength in a relatively long time, and therefore the dual-mode ONU switches to the OLT mode to implement an OLT function. In this way, the first ONU and the second ONU can communicate with each other by using the dual-mode ONU operating in the OLT mode, and the communication data collected by the first wireless local area network access device connected to the first ONU is transmitted to the second wireless local area network access device connected to the second ONU, to ensure communication between the terminal connected to the first wireless local area network access device and the terminal connected to the second wireless local area network access device.

In an implementation, the optical communication device includes a switching device, and the optical network system further includes a controller. The controller is separately connected to each switching device, and is configured to allocate an optical signal wavelength in a transmit direction and an optical signal wavelength in a receive direction to a first switching device and a second switching device that have a communication requirement. An optical signal wavelength in a transmit direction of the first switching device is equal to an optical signal wavelength in a receive direction of the second switching device, an optical signal wavelength in a receive direction of the first switching device is equal to an optical signal wavelength in a transmit direction of the second switching device, and the first switching device and the second switching device are respectively switching devices that have the communication requirement.

In the foregoing implementations, if any two switching devices connected to the splitting apparatus need to communicate with each other, the two switching devices may communicate with each other based on the wavelength in the transmit direction and the wavelength in the receive direction that are allocated by the controller.

In an implementation, the switching device includes at least one of a switch and a router.

In an implementation, the M splitting elements are M splitters with a split ratio of 1:N; the M splitting elements are M splitters with a split ratio of 2:N; or the M splitting elements include X splitters with a splitting ratio 1:N and Y splitters with a splitting ratio 2:N, where X+Y=M, and both X and Y are integers greater than or equal to 1.

In an implementation, N=2m, and m is an integer greater than 1.

Another object of this disclosure is to provide a dual-mode ONU and an optical network system-based communication method, to implement disaster recovery of an optical network.

According to a third aspect, a dual-mode ONU is provided, and the dual-mode ONU includes:

an ONU module, configured to receive an optical signal of a first wavelength and send an optical signal of a second wavelength;

an OLT module, configured to send the optical signal of the first wavelength and receive the optical signal of the second wavelength; and a switching control unit, configured to control the dual-mode ONU to operate in one of an ONU mode and an OLT mode, where when the dual-mode ONU operates in the ONU mode, if it is detected that duration in which the ONU module does not receive the optical signal of the first wavelength is greater than or equal to specified duration, light emission of the OLT module is enabled, light emission of the ONU module is disabled, and light reception of the ONU module is maintained, so that the dual-mode ONU switches to the OLT mode.

In an implementation, the switching control unit is specifically configured to: when the dual-mode ONU operates in the OLT mode, if the ONU module receives the optical signal of the first wavelength, disable light emission of the OLT module and enable light emission of the ONU module, so that the dual-mode ONU switches to the ONU mode.

In an implementation, the dual-mode ONU further includes:

an Ethernet switching unit;

a first encapsulation processing unit coupled between the ONU module and the Ethernet switching unit, configured to: process a passive optical network PON data frame from the ONU module into an Ethernet frame and send the Ethernet frame to the Ethernet switching unit, and/or process an Ethernet frame from the Ethernet switching unit into a PON data frame and send the PON data frame to the ONU module; and a second encapsulation processing unit coupled between the OLT module and the Ethernet switching unit, configured to: process a passive optical network PON data frame from the OLT module into an Ethernet frame and send the Ethernet frame to the Ethernet switching unit, and/or process an Ethernet frame from the Ethernet switching unit into a PON data frame and send the PON data frame to the OLT module.

According to a fourth aspect, an optical network system-based communication method is provided, and is applied to the splitting apparatus according to any implementation of the first aspect and the dual-mode ONU according to any implementation of the third aspect. The method includes:

When the dual-mode ONU connected to the splitting apparatus operates in an ONU mode, if duration in which an optical signal of a first wavelength is not received is greater than or equal to specified duration, the dual-mode ONU switches to an OLT mode; and after the dual-mode ONU operating in the OLT mode receives an optical signal of a second wavelength from a first ONU connected to the splitting apparatus, the dual-mode ONU converts the optical signal of the second wavelength into the optical signal of the first wavelength, and sends the optical signal of the first wavelength to the splitting apparatus, so that the optical signal of the first wavelength is received by a second ONU connected to the splitting apparatus.

In an implementation, the method further includes:

When the ONU module of the dual-mode ONU operating in the OLT mode receives the optical signal of the first wavelength, the dual-mode ONU switches to the ONU mode, where the optical signal of the first wavelength is an optical signal that is of the first wavelength and that is sent, after a connection between an OLT and the splitting apparatus is recovered, by the OLT within a time period in which the OLT sends the optical signal of the first wavelength.

In an implementation, the first ONU is connected to an audio and video collection device and the second ONU is connected to a storage device.

The dual-mode ONU operating in the OLT mode receives the optical signal that is of the second wavelength and that is sent by the first ONU, the optical signal of the second wavelength carries audio and video data sent to the storage device, and the audio and video data is collected by the audio and video collection device connected to the first ONU.

The optical signal of the second wavelength is converted into the optical signal of the first wavelength.

The optical signal of the first wavelength is sent to the splitting apparatus, so that the optical signal of the first wavelength is received by the second ONU, and the second ONU sends the audio and video data carried by the optical signal of the first wavelength to the storage device.

In an implementation, the first ONU is connected to a first wireless local area network access device, and the second ONU is connected to a second wireless local area network access device.

The dual-mode ONU operating in the OLT mode receives the optical signal that is of the second wavelength and that is sent by the first ONU, the optical signal of the second wavelength carries communication data sent to a terminal connected to the second wireless local area network access device, and the communication data is sent by a terminal connected to the first wireless local area network access device connected to the first ONU.

The optical signal of the second wavelength is converted into the optical signal of the first wavelength.

The optical signal of the first wavelength is sent to the splitting apparatus, so that the optical signal of the first wavelength is received by the second ONU, and the second ONU sends the communication data carried by the optical signal of the first wavelength to the terminal connected to the second wireless local area network access device.

According to a fifth aspect, a computer-readable storage medium is provided. The computer-readable storage medium includes a computer program, and when the computer program is run on an electronic device, the electronic device is enabled to perform the method according to any implementation of the fourth aspect.

According to a sixth aspect, a computer program product is provided. When the computer program product is invoked by a computer, the computer is enabled to perform the method according to any implementation of the fourth aspect.

For beneficial effects of the third aspect to the sixth aspect, refer to beneficial effects of the first aspect and the second aspect. Details are not described again.

The foregoing and other objectives are to be achieved by features in the independent claims. Further implementations are embodied in the dependent claims, the specification, and the accompanying drawings.

DESCRIPTION OF EMBODIMENTS

For clearer understanding of embodiments of this disclosure, a splitter is first briefly described below.

The splitter is also referred to as an optical splitter, and is a fiber junction component having a plurality of input ends and a plurality of output ends. The splitter is commonly used for coupling, branching, and allocation of optical signals.

A main function of the splitter is to distribute downlink data and centralize uplink data. In a downlink transmission direction, an optical signal from the input end is allocated to all output ports for transmission. In an uplink transmission direction, an optical signal from an output port can only be transmitted from the input end. In the downlink transmission direction and the uplink transmission direction, optical signal strength or optical power is to decrease. Optical signal output strength of each output port may be the same or different.

A split ratio of the splitter represents a ratio of optical power output from a specific output end of the splitter to total output optical power.

(1) 2:2 Splitter

Figure 1:
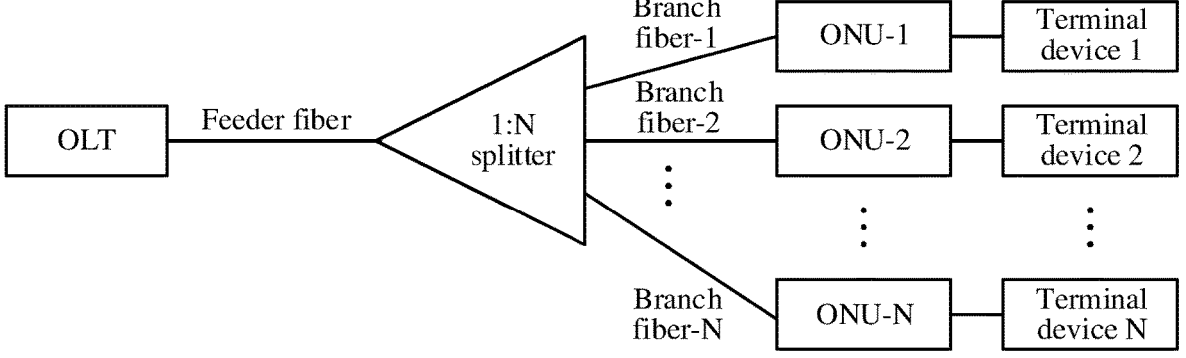
FIG. 1 is a schematic diagram of a 1:N splitter.
Figure 2:
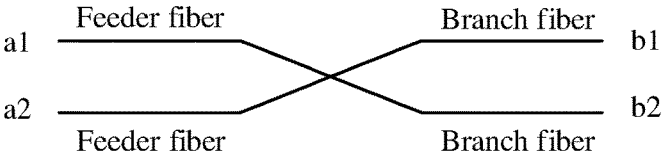
FIG. 2 is a schematic diagram of a 2:2 splitter assembly.

A basic component of the splitter is a 2:2 splitter assembly, as shown in FIG. 2. The 2:2 splitter assembly may be a fused fiber taper splitter (FFC), that is, a passive component formed by coupling two fibers in a fused fiber taper manner. Reference characters a1 and a2 respectively represent two input ends of the splitter assembly, and reference characters b1 and b2 respectively represent two output ends of the splitter assembly. Light is bidirectionally reachable between a feeder fiber connected to the input end a1 and a branch fiber connected to the output end b1, and between the feeder fiber connected to the input end a1 and a branch fiber connected to the output end b2. Light is bidirectionally reachable between a feeder fiber connected to the input end a2 and the branch fiber connected to the output end b1, and between the feeder fiber connected to the input end a2 and the branch fiber connected to the output end b2. Light is not reachable between the feeder fiber connected to the input end a1 and the feeder fiber connected to the input end a2, and light is not reachable between the branch fiber connected to the output end b1 and the branch fiber connected to the output end b2.

(2) 1:2 Splitter

Figure 3:
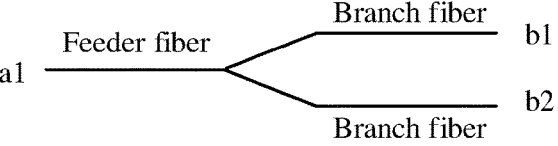
FIG. 3 is a schematic diagram of a 1:2 splitter assembly.

The 1:2 splitter may be considered as a passive splitter obtained by cutting off the input end a2 and the connected feeder fiber based on the 2:2 splitter, as shown in FIG. 3.

(3) 1:N Splitter

One 1:N splitter may be formed after m layers of 1:2 splitters are stacked. $N=2^m$, and m is an integer greater than 1. N is a quantity of branch fibers, and m is a quantity of layers of splitters.

Figures 4, 5:
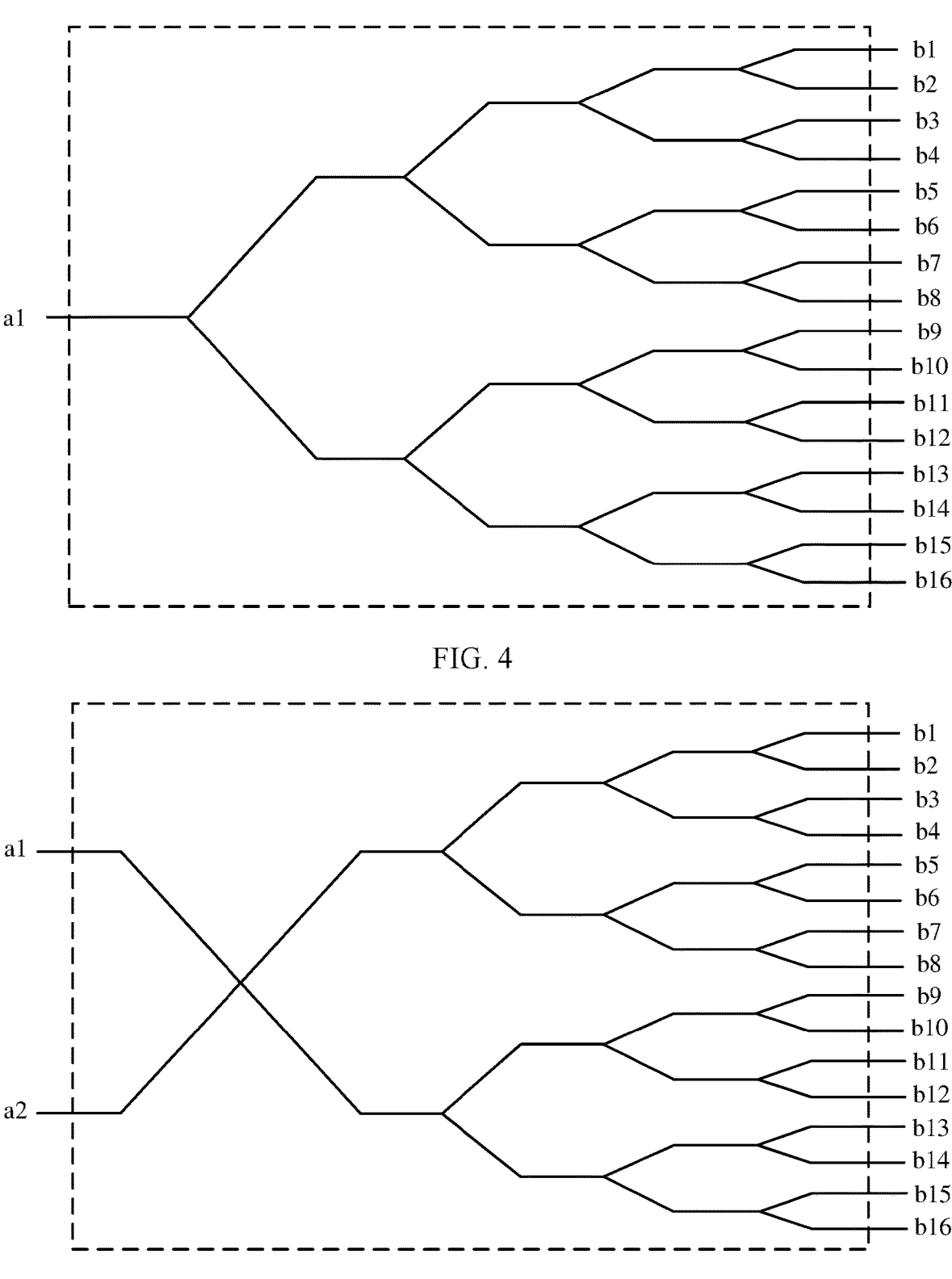
FIG. 4 is a schematic diagram of a 1:16 splitter.
FIG. 5 is a schematic diagram of a 2:16 splitter.

For example, as shown in FIG. 4, for a 1:16 splitter, there are N=16 output ports inside the splitter that are configured to connect to 16 branch fibers (b1 to b16 shown in the figure), and there are a total of m=4 layers 1:2 splitters.

Layer 1: One 1:2 splitter.
Layer 2: Two 1:2 splitters.
Layer 3: Four 1:2 splitters.
Layer 4: Eight 1:2 splitters.

The input end a1 and an output end bi (i=1, 2, 3, . . . , 16) may perform bidirectional optical communication by using a fiber.

An OLT connected to the input end a1 by using the feeder fiber and an ONU connected to the output end bi by using the branch fiber communicate with each other in a single-fiber bidirectional manner. A gigabit-capable passive optical network (GPON) is used as an example. Light with a center wavelength of 1490 nm is used in a direction from the OLT to the ONU (a downlink direction), and light with a center wavelength of 1310 nm is used in a direction from the ONU to the OLT (an uplink direction). Transmission of light with a plurality of wavelengths is allowed in one physical fiber.

Communication between ONUs-n (a value range of n is from 1 to N) needs to be switched on the OLT or on an upper-layer device. In a PON system based on the 1:N splitter, if the feeder fiber is disconnected, all ONUs cannot communicate with each other.

(4) 2:N Splitter

To protect the feeder fiber and increase reliability of the PON network, the 2:N splitter may be used. A protection mode in which the 2:N splitter is used is referred to as TypeB protection. The 2:N splitter is separately connected to two OLTs (such as an OLT-1 and an OLT-2) by using two feeder fibers, or is connected to two PON ports of a same OLT, to protect the feeder fiber. For example, the 2:N splitter is separately connected to two OLTs (such as the OLT-1 and the OLT-2) by using two feeder fibers. After a feeder fiber connected to the OLT-1 is interrupted, a communication connection between ONUs may be switched from the OLT-1 to the OLT-2 in 50 ms.

FIG. 5 shows an example 2:16 splitter. The 2:16 splitter may be obtained by replacing the 1:2 splitter at the layer 1 in the 1:16 splitter shown in FIG. 4 with a 2:2 splitter. As shown in FIG. 5, in the 2:16 splitter, two input ends (a1 and a2) are connected to two feeder fibers, and the input end a1 and the input end a2 have entirely consistent features. When a feeder fiber connected to the input end a1 is interrupted, communication may be performed by using a feeder fiber connected to the input end a2. However, when both the feeder fiber connected to the input end a1 and the feeder fiber connected to the input end a2 are disconnected, an ONU-1, an ONU-2, . . . , and an ONU-16 cannot communicate with each other.

As a PON technology moves from a fiber to the home (FTTH) to an industrial scenario, such as application in a mine, if the 2:N splitter is used, there is still a relatively high reliability risk. This is mainly caused because an optical signal channel between output ends of the splitter and an optical signal channel between the output end and the input end are not peer-to-peer. For example, in a mine application scenario, an OLT is generally placed on the ground, a PON port of the OLT is connected to a splitter in a mine by using a feeder fiber, and a branch fiber of the splitter is connected to an ONU. When an accident occurs, two OLTs are faulty or two feeder fibers connected to the OLT are faulty, terminal devices connected to the ONU in the mine cannot communicate with each other, and therefore, a security requirement cannot be met.

Therefore, an embodiment provides a splitting apparatus and an optical network system implemented based on the splitting apparatus. The splitting apparatus uses an optical bus structure with peer-to-peer topologies, so that optical signal channels between different ports of the splitting apparatus are peer-to-peer, and in this way, optical transmission based on the optical bus structure with peer-to-peer topologies is implemented.

The following describes in detail embodiments of this disclosure with reference to the accompanying drawings.

The splitting apparatus provided in this embodiment of this disclosure may include M splitting elements. Each splitting element includes at least one feeder end and N branch ends, where M=N+1. Optionally, N=2m, and m is an integer greater than 1.

The splitting element may be implemented by a splitter including N outputs. The feeder end of the splitting element is an input end of the splitter, and the branch end of the splitting element is an output end of the splitter.

Each branch end of each splitting element is coupled to one branch end of another splitting element in the M splitting elements, and different branch ends of each splitting element are coupled to one branch end of different splitting elements. For example, a branch end 1 of a splitting element 1 is coupled to a branch end 1 of a splitting element 2, a branch end 2 of the splitting element 1 is coupled to a branch end 1 of a splitting element 3, and a branch end 3 of the splitting element 1 is coupled to a branch end 1 of a splitting element 4, to form a structure in which the branch ends of the splitting elements are interconnected.

Optionally, the M splitting elements may be packaged in a housing structure, and M groups of ports are disposed on the housing structure. A feeder end of each splitting element is coupled to one group of ports in the M groups of ports, and feeder ends of different splitting elements are coupled to different groups of ports. For example, a feeder end of the splitting element 1 is coupled to a port in a port group 1, a feeder end of the splitting element 2 is coupled to a port in a port group 2, a feeder end of the splitting element 3 is coupled to a port in a port group 3, and so on.

Each port of the splitting apparatus may be a fiber interface, and an optical communication device may be connected to one port or one group of ports of the splitting apparatus by using a fiber, to form an optical transmission network based on the splitting apparatus.

The optical communication device is a device that performs communication by using an optical signal. For example, the optical communication device may include an OLT, an ONU, and a switching device. The switching device may include a switch, a router, and the like. An optical module may be configured on the switching device to transmit an optical signal.

Coupling in this embodiment means a connection manner of a fiber, for example, may include fusion connect, a connection established by using a fusion connect component, or a connection established in another manner. This is not limited in this embodiment of this disclosure.

In the splitting apparatus, branch ends of N+1 (that is, M, where M=N+1) splitting elements that have N branch ends (or referred to as N outputs) are interconnected, so that optical channels between any two groups of ports of the splitting apparatus are peer-to-peer. If one group of ports of the splitting apparatus is referred to as one dimension, N+1 port groups may form N+1 dimensions. When the splitting apparatus is used to perform PON networking, if a port in any port group is connected to the OLT, and a port in another port group is connected to the ONU, optical signal transmission between the OLT and each ONU may be implemented; in other words, optical signal transmission between any two dimensions can be implemented, and optical signal transmission in any two dimensions is peer-to-peer, so that an optical bus structure with (N+1) peer-to-peer topologies is formed inside the splitting apparatus. Based on the optical bus structure with peer-to-peer topologies, each port of the splitting apparatus may be connected to the OLT by using the feeder fiber, or may be connected to the ONU by using the branch fiber.

Each group of ports of the splitting apparatus includes at least one port. Quantities of ports included in different port groups may be the same or may be different. For example, all port groups each include only one port; all port groups each include two ports; or the port group 1 includes one port, and the port group 2 includes two ports.

In some embodiments, all the N+1 (that is, M) splitting elements are splitters with a split ratio of K:A, and K is an integer less than or equal to 2. When K=1, the N+1 splitting elements (that is, M) are all 1:N splitters. When K=2, the N+1 (that is, M) splitting elements are all 2:N splitters. In other embodiments, the splitting elements in the splitting apparatus may alternatively have different quantities of feeder ends; in other words, at least two splitting elements have different quantities of feeder ends. For example, the splitting apparatus includes a first splitting element and a second splitting element, the first splitting element has one feeder end, and the second splitting element has two feeder ends.

In some embodiments, in the splitting apparatus, one feeder end of the splitting element is coupled to one port of the splitting apparatus. Specifically, the M splitting elements include at least one first splitting element, the first splitting element includes K feeder ends, one group of ports coupled to the first splitting element includes K ports, the K feeder ends of the first splitting element are respectively coupled to the K ports in the group of ports, and K is an integer less than or equal to 2.

For example, one port group includes one port, and a splitting element coupled to the port group includes one feeder end, and the feeder end is coupled to the only port included in the port group. For another example, one port group includes two ports, a splitting element coupled to the port group includes two feeder ends, and each of the two feeder ends is coupled to one port in the port group. For example, a feeder end 1 of the splitting element is coupled to a port 1 in the port group, and a feeder end 2 of the splitting element is coupled to a port 2 in the port group. If one port group includes two ports, the port group may be separately connected to two PON ports of one OLT by using two feeder fibers, or may be connected to two OLTs by using two feeder fibers, so that redundancy protection can be implemented on the fibers connected to the OLT. When one of the fibers is disconnected, the port group may be quickly (for example, in 50 ms) switched to the other feeder fiber, to ensure optical signal transmission.

In some embodiments, all the splitting elements in the splitting apparatus may be cascaded by using a plurality of basic splitter assemblies (such as a 1:2 splitter assembly and/or a 2:2 splitter assembly). Splitter assemblies of different splitting elements may be cascaded in a same manner or in different manners.

For example, all the splitting elements in the splitting apparatus are 1:16 splitters, and the 1:16 splitter is formed by cascading four layers of 1:2 splitter assemblies, as shown in FIG. 4. For the 1:16 splitter shown in FIG. 4, optical signal output strength of each branch end may be approximately the same.

For another example, all the splitting elements in the splitting apparatus are 1:6 splitters formed by cascading a plurality of 1:2 splitter assemblies, and splitter assemblies in different splitting elements are cascaded in different manners. For example, a cascading manner of splitter assemblies in some splitting elements may be shown in (a) in FIG. 6, and a cascading manner of splitter assemblies in other splitting elements may be shown in (b) in FIG. 6. For the 1:6 splitter shown in FIG. 6, optical signal output intensity at all the branch ends is not approximately the same. For example, for the 1:6 splitter shown in (a) in FIG. 6, if optical signal input intensity at the feeder end is 100%, the optical signal output intensity is separately approximately 12.5%, 12.5%, 12.5%, 12.5%, 25%, and 25% in a sequence from a branch end b1 to a branch end b6.

The splitting apparatus in each embodiment of this disclosure provides the splitting elements have a same quantity of branch ends (or referred to as output ends), to interconnect branch ends of different splitting elements. However, other features of the splitting element, such as a quantity of feeder ends (or referred to as input ends), a cascading manner of basic splitter assemblies constituting the splitting element, and whether optical signal output intensity at each branch end is the same may be not limited.

According to a combination of any one or more of the foregoing embodiments, a splitting apparatus of a 1×(N+1) structure may be implemented, or a splitting apparatus of a 2×(N+1) structure may be implemented. The splitting apparatus of the 1×(N+1) structure includes N+1 splitting elements with one feeder end and N branch ends, and branch ends of these splitting elements are interconnected to form a splitting bus structure with 1×(N+1) peer-to-peer topologies. The splitting apparatus of the 2×(N+1) structure includes N+1 splitting elements with two feeder ends and N branch ends, and branch ends of these splitting elements are interconnected to form a splitting bus structure with 2×(N+1) peer-to-peer topologies. Each dimension in the splitting apparatus of the 2×(N+1) structure has two entirely consistent optical signals (in other words, a feeder end of each splitting element may receive an optical signal and may also output an optical signal). A property of the dimension is the same as a property of a feeder fiber of one 2:N splitter.

Figures 6, 7:
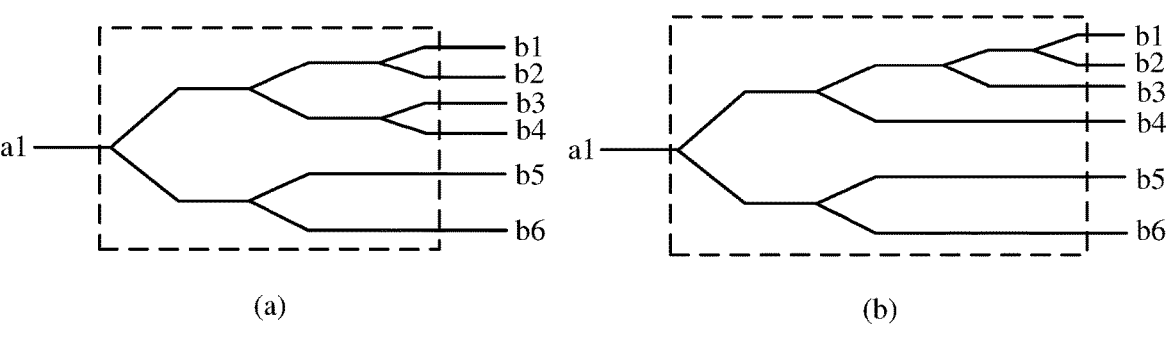
FIG. 6 is a schematic diagram of a 1:6 splitter according to an embodiment of this disclosure.
FIG. 7 is a schematic diagram of a structure of a 1×(4+1) splitting apparatus according to an embodiment of this disclosure.

N=4 is used as an example. FIG. 7 shows a splitting apparatus of a 1×(4+1) structure according to an embodiment of this disclosure. The splitting apparatus includes five 1:4 splitters (identified as "#1" to "#5" in the figure). The splitting apparatus includes five ports (identified as "port 1" to "port 5" in the figure). Each port may be connected to an optical communication device by using a fiber.

In the splitting apparatus shown in FIG. 7, because each port group includes one unique port, "port group" is not used for description herein, but "port" is directly used for description.

As shown in FIG. 7, a feeder end a1-1 of a splitter #1 is coupled to the port 1, a feeder end a1-2 of a splitter #2 is coupled to a port 2, a feeder end a1-3 of a splitter #3 is coupled to a port 3, a feeder end a1-4 of a splitter #4 is coupled to a port 4, and a feeder end a1-5 of a splitter #5 is coupled to the port 5.

A relationship between each branch end of the splitter #1 and a branch end of another splitter is as follows:

A branch end b1-1 of the splitter #1 is connected to a branch end b4-2 of the splitter #2.

A branch end b2-1 of the splitter #1 is connected to a branch end b3-3 of the splitter #3.

A branch end b3-1 of the splitter #1 is connected to a branch end b2-4 of the splitter #4.

A branch end b4-1 of the splitter #1 is connected to a branch end b1-5 of the splitter #5.

A relationship between each branch end of the splitter #2 and a branch end of another splitter is as follows:

A branch end b1-2 of the splitter #2 is connected to a branch end b4-3 of the splitter #3.

A branch end b2-2 of the splitter #2 is connected to a branch end b3-4 of the splitter #4.

A branch end b3-2 of the splitter #2 is connected to a branch end b2-5 of the splitter #5.

The branch end b4-2 of the splitter #2 is connected to the branch end b1-1 of the splitter #1.

A relationship between each branch end of the splitter #3 and a branch end of another splitter is as follows:

A branch end b1-3 of the splitter #3 is connected to a branch end b4-4 of the splitter #4.

A branch end b2-3 of the splitter #3 is connected to a branch end b3-5 of the splitter #5.

A branch end b3-3 of the splitter #3 is connected to the branch end b2-1 of the splitter #1.

The branch end b4-3 of the splitter #3 is connected to the branch end b1-2 of the splitter #2.

A relationship between each branch end of the splitter #4 and a branch end of another splitter is as follows:

A branch end b1-4 of the splitter #4 is connected to a branch end b4-5 of the splitter #5.

The branch end b2-4 of the splitter #4 is connected to the branch end b3-1 of the splitter #1.

The branch end b3-4 of the splitter #4 is connected to the branch end b2-2 of the splitter #2.

The branch end b4-4 of the splitter #4 is connected to the branch end b1-3 of the splitter #3.

A relationship between each branch end of the splitter #5 and a branch end of another splitter is as follows:

The branch end b1-5 of the splitter #5 is connected to the branch end b4-1 of the splitter #1.

The branch end b2-5 of the splitter #5 is connected to the branch end b3-2 of the splitter #2.

The branch end b3-5 of the splitter #5 is connected to the branch end b2-3 of the splitter #3.

The branch end b4-5 of the splitter #5 is connected to the branch end b1-4 of the splitter #4.

The splitting apparatus of the 1×(4+1) structure may implement the following functions:

An optical signal entering from the port 1 (that is, the feeder end a1-1 of the splitter #1) may be output separately from the port 2 (that is, the feeder end a1-2 of the splitter #2), the port 3 (that is, the feeder end a1-3 of the splitter #3), the port 4 (that is, the feeder end a1-4 of the splitter #4), and the port 5 (that is, the feeder end a1-5 of the splitter #5).

An optical signal entering from the port 2 (that is, the feeder end a1-2 of the splitter #2) may be output separately from the port 3 (that is, the feeder end a1-3 of the splitter #3), the port 4 (that is, the feeder end a1-4 of the splitter #4), the port 5 (that is, the feeder end a1-5 of the splitter #5), and the port 1 (that is, the feeder end a1-1 of the splitter #1).

An optical signal entering from the port 3 (that is, the feeder end a1-3 of the splitter #3) may be output separately from the port 4 (that is, the feeder end a1-4 of the splitter #4), the port 5 (that is, the feeder end a1-5 of the splitter #5), the port 1 (that is, the feeder end a1-1 of the splitter #1), and the port 2 (that is, the feeder end a1-2 of the splitter #2).

An optical signal entering from the port 4 (that is, the feeder end a1-4 of the splitter #4) may be output separately from the port 5 (that is, the feeder end a1-5 of the splitter #5), the port 1 (that is, the feeder end a1-1 of the splitter #1), the port 2 (that is, the feeder end a1-2 of the splitter #2), and the port 3 (that is, the feeder end a1-3 of the splitter #3).

An optical signal entering from the port 5 (that is, the feeder end a1-5 of the splitter #5) may be output separately from the port 1 (that is, the feeder end a1-1 of the splitter #1), the port 2 (that is, the feeder end a1-2 of the splitter #2), the port 3 (that is, the feeder end a1-3 of the splitter #3), and the port 4 (that is, the feeder end a1-4 of the splitter #4).

Optical signal communication may be implemented between any two ports (or referred to as any two dimensions) of the splitting apparatus of the 1×(4+1) structure. For example, light of any wavelength may be communicated between the port 1 and the port 4. Light entering from the port 1 is transmitted to any port (the port 2, the port 3, the port 4, and the port 5 in the figure) other than the port 1. Similarly, light entering from the port 4 is transmitted to any port (the port 2, the port 3, the port 5, and the port 1 in the figure) other than the port 4.

Figures 8, 9A:
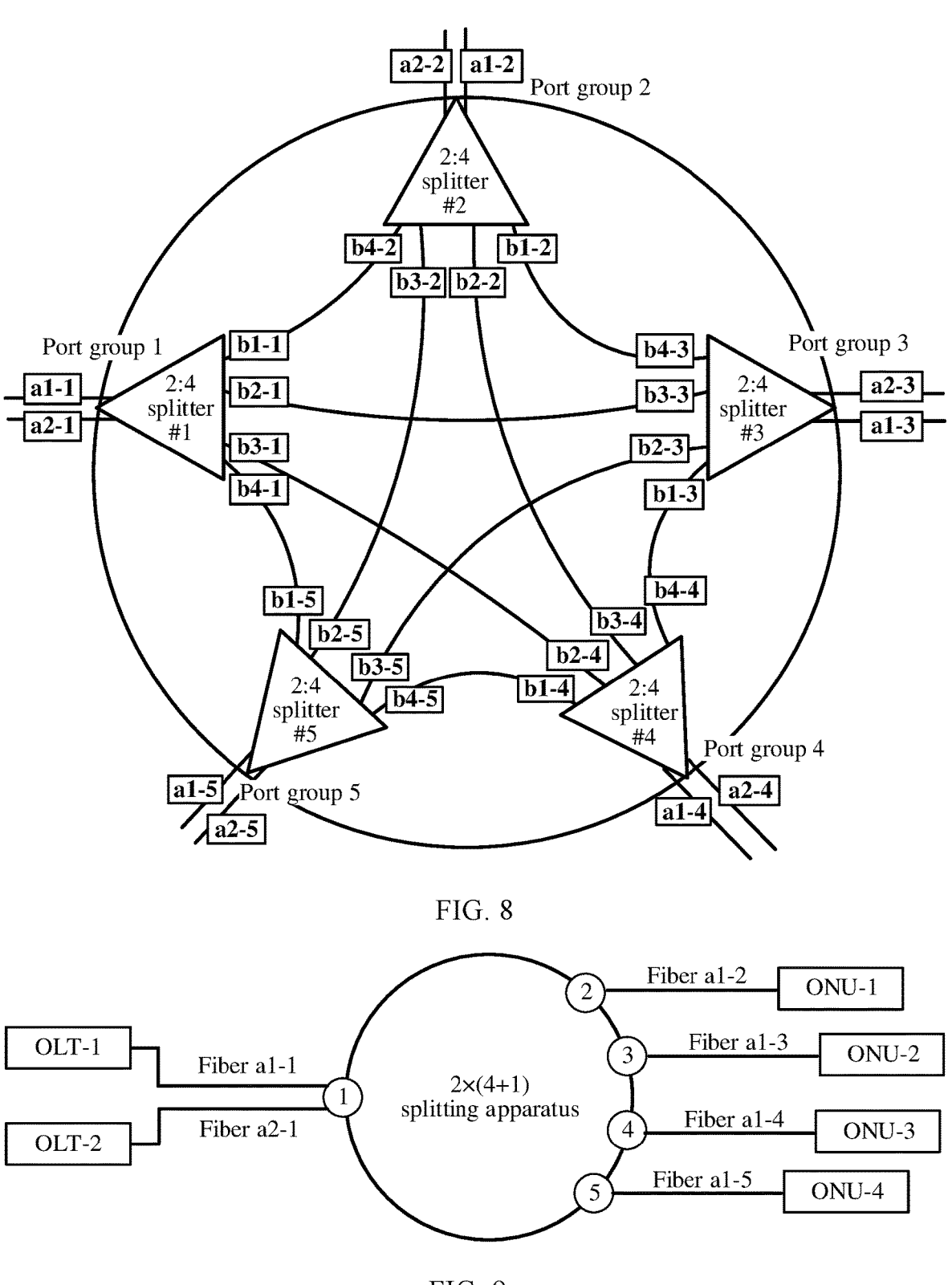
FIG. 8 is a schematic diagram of a structure of a 2×(4+1) splitting apparatus according to an embodiment of this disclosure.
FIG. 9a, FIG. 9b, FIG. 9c, and FIG. 9d are respectively schematic diagrams of applying a 2×(4+1) splitting apparatus to PON networking according to an embodiment of this disclosure.

N=4 is used as an example. FIG. 8 shows a splitting apparatus of a 2×(4+1) structure according to an embodiment of this disclosure. The splitting apparatus includes five 2:4 splitters (identified as "#1" to "#5" in the figure). The splitting apparatus includes five port groups, each port group includes two ports, and each port may be connected to an optical communication device by using a fiber.

As shown in FIG. 8, a feeder end a1-1 and a feeder end a2-1 of a splitter #1 are separately coupled to two ports in a port group 1, a feeder end a1-2 and a feeder end a2-2 of a splitter #2 are separately coupled to two ports in a port group 2, a feeder end a1-3 and a feeder end a2-3 of a splitter #3 are separately coupled to two ports in a port group 3, a feeder end a1-4 and a feeder end a2-4 of a splitter #4 are separately coupled to two ports in a port group 4, and a feeder end a1-5 and a feeder end a2-5 of a splitter #5 are separately coupled to two ports in a port group 5.

An interconnection relationship between branch ends of the splitters is similar to the interconnection relationship shown in FIG. 7. Details are not described herein again.

The splitting apparatus of the 2×(4+1) structure may implement the following functions:

An optical signal entering from the feeder end a1-1 of the splitter #1 may be output separately from the two feeder ends (a1-2 and a2-2) of the splitter #2, the two feeder ends (a1-3 and a2-3) of the splitter #3, the two feeder ends (a1-4 and a2-4) of the splitter #4, and the two feeder ends (a1-5 and a2-5) of the splitter #5.

An optical signal entering from the feeder end a2-1 of the splitter #1 may be output separately from the two feeder ends (a1-2 and a2-2) of the splitter #2, the two feeder ends (a1-3 and a2-3) of the splitter #3, the two feeder ends (a1-4 and a2-4) of the splitter #4, and the two feeder ends (a1-5 and a2-5) of the splitter #5.

An optical signal entering from the feeder end a1-2 of the splitter #2 may be output separately from the two feeder ends (a1-3 and a2-3) of the splitter #3, the two feeder ends (a1-4 and a2-4) of the splitter #4, the two feeder ends (a1-5 and a2-5) of the splitter #5, and the two feeder ends (a1-1 and a2-1) of the splitter #1.

An optical signal entering from the feeder end a2-2 of the splitter #2 may be output separately from the two feeder ends (a1-3 and a2-3) of the splitter #3, the two feeder ends (a1-4 and a2-4) of the splitter #4, the two feeder ends (a1-5 and a2-5) of the splitter #5, and the two feeder ends (a1-1 and a2-1) of the splitter #1.

An optical signal entering from the feeder end a1-3 of the splitter #3 may be output separately from the two feeder ends (a1-4 and a2-4) of the splitter #4, the two feeder ends (a1-5 and a2-5) of the splitter #5, the two feeder ends (a1-1 and a2-1) of the splitter #1, and the two feeder ends (a1-2 and a2-2) of the splitter #2.

An optical signal entering from the feeder end a2-3 of the splitter #3 may be output separately from the two feeder ends (a1-4 and a2-4) of the splitter #4, the two feeder ends (a1-5 and a2-5) of the splitter #5, the two feeder ends (a1-1 and a2-1) of the splitter #1, and the two feeder ends (a1-2 and a2-2) of the splitter #2.

An optical signal entering from the feeder end a1-4 of the splitter #4 may be output separately from the two feeder ends (a1-5 and a2-5) of the splitter #5, the two feeder ends (a1-1 and a2-1) of the splitter #1, the two feeder ends (a1-2 and a2-2) of the splitter #2, and the two feeder ends (a1-3 and a2-3) of the splitter #3.

An optical signal entering from the feeder end a2-4 of the splitter #4 may be output separately from the two feeder ends (a1-5 and a2-5) of the splitter #5, the two feeder ends (a1-1 and a2-1) of the splitter #1, the two feeder ends (a1-2 and a2-2) of the splitter #2, and the two feeder ends (a1-3 and a2-3) of the splitter #3.

An optical signal entering from the feeder end a1-5 of the splitter #5 may be output separately from the two feeder ends (a1-1 and a2-1) of the splitter #1, the two feeder ends (a1-2 and a2-2) of the splitter #2, the two feeder ends (a1-3 and a2-3) of the splitter #3, and the two feeder ends (a1-4 and a2-4) of the splitter #4.

An optical signal entering from the feeder end a2-5 of the splitter #5 may be output separately from the two feeder ends (a1-1 and a2-1) of the splitter #1, the two feeder ends (a1-2 and a2-2) of the splitter #2, the two feeder ends (a1-3 and a2-3) of the splitter #3, and the two feeder ends (a1-4 and a2-4) of the splitter #4.

It may be learned that optical signal communication may be implemented between one port in any group of ports of the splitting apparatus of the 2×(4+1) structure and one port in another group of ports (or referred to as any two dimensions). An optical signal cannot be communicated between a same group of ports (that is, a same dimension).

The splitting apparatus provided in this embodiment of this disclosure may be applied to PON networking. FIG. 9*a*, FIG. 9*b*, FIG. 9*c*, FIG. 9*d*, and FIG. 10 are separately example schematic diagrams of applying the splitting apparatus provided in this embodiment of this disclosure to PON networking.

When the splitting apparatus provided in this embodiment of this disclosure is applied to PON networking, at least two optical communication devices may be connected to the splitting apparatus provided in this embodiment of this disclosure, and each optical communication device may be connected to one group of ports in M groups of ports of the splitting apparatus by using a fiber.

Optionally, the optical communication device may include an OLT, an ONU, and the like. Specifically, the OLT may be connected to any group of ports of the splitting apparatus by using a feeder fiber, and the ONU is connected to another group of ports of the splitting apparatus by using a branch fiber.

In a downlink direction, an optical signal is input from the OLT to a port on which the splitting apparatus is connected to the OLT, and output from a port on which the splitting apparatus is connected to the ONU to the ONU. In an uplink direction, an optical signal is input from the ONU to a port on which the splitting apparatus is connected to the ONU, and output from a port on which the splitting apparatus is connected to the OLT to the OLT. In the uplink direction, the splitting apparatus is essentially an optical signal mixer, and may mix wavelengths of light of any color and then output the light from the port connected to the OLT.

Different ONUs may communicate with each other based on a switching function of the OLT. Specifically, for example, an ONU-1 communicates with an ONU-2. After receiving a PON data frame from the ONU-1, the OLT decapsulates the PON data frame into an Ethernet frame, obtains a destination media access control (MAC) address in the Ethernet frame, and searches a forwarding table based on the MAC address to obtain a logical link identifier (LLID) of a destination ONU (that is, the ONU-2) corresponding to the MAC address, and then the OLT re-encapsulates the Ethernet frame into a PON data frame that carries the LLID of the destination ONU (the ONU-2), and sends the re-encapsulated PON data frame to the splitting apparatus. After receiving the PON data frame from the OLT, if the ONU-2 connected to the splitting apparatus determines that the LLID that is of the destination ONU and that is carried in the PON data frame is the same as the LLID of the ONU-2, the ONU-2 decapsulates the PON data frame, and sends an Ethernet frame obtained through decapsulation to a terminal device connected to the ONU. After receiving the PON data frame, if an ONU-3 determines that the LLID that is of the destination ONU and that is carried in the PON data frame is different from an LLID of the ONU-3, the PON data frame is discarded.

An LLID of an ONU may uniquely identify an ONU connected to the splitting apparatus. The LLID of the ONU is allocated by the OLT when the ONU registers with the OLT.

The forwarding table may be obtained through learning. Specifically, in the uplink direction, after receiving a PON data frame from an ONU by using the splitting apparatus, the OLT decapsulates the PON data frame to obtain an Ethernet frame, and saves a source MAC address of the Ethernet frame and an LLID (that is, an LLID of the ONU that sends the PON data frame) carried in the PON data frame to the forwarding table.

In some cases, the OLT may identify the PON data frame as a broadcast frame, and send the PON data frame to all ONUs connected to the splitting apparatus, to implement broadcast communication. In other cases, the OLT may identify the PON data frame as a multicast frame, and send the PON data frame to an ONU in a corresponding multicast group, to implement multicast communication.

FIG. 9a is a schematic diagram of applying a 2×(4+1) splitting apparatus provided in an embodiment of this disclosure to PON networking. Port groups 1 to 5 of the splitting apparatus in the figure are represented by circles with numbers. As shown in the figure, an OLT-1 is connected to one port in the port group 1 of the splitting apparatus by using a fiber a1-1, and an OLT-2 is connected to another port in the port group 1 of the splitting apparatus by using a fiber a2-1; and an ONU-1 is connected to one port in a port group 2 of the splitting apparatus by using a fiber a1-2, an ONU-2 is connected to one port in a port group 3 of the splitting apparatus by using a fiber a1-3, an ONU-3 is connected to one port in a port group 4 of the splitting apparatus by using a fiber a1-4, and an ONU-4 is connected to one port in the port group 5 of the splitting apparatus by using a fiber a1-5. All the ONU-1 to the ONU-4 may be conventional ONUs. This is not limited in this embodiment of this disclosure.

Figures 9B, 9C, 9D:
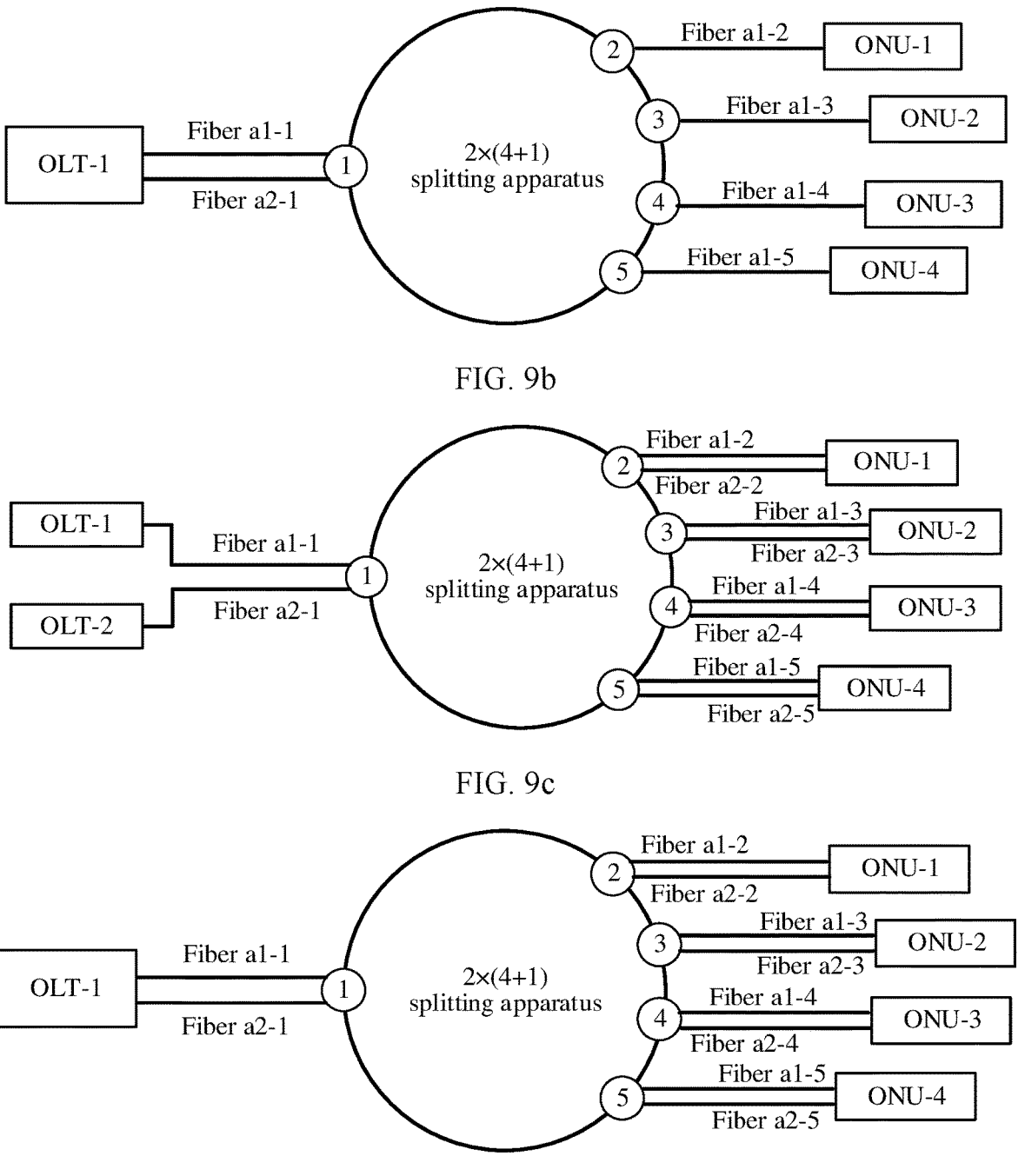

Only an example of a PON system implemented based on the 2×(4+1) splitting apparatus is shown above. In other embodiments, two PON ports of the OLT-1 are connected to two ports in one group of ports of the splitting apparatus by using two fibers (the fiber a1-1 and the fiber a2-1), as shown in FIG. 9b. In other embodiments, one ONU may alternatively be connected to two ports in one group of ports of the splitting apparatus by using two fibers, as shown in FIG. 9c and FIG. 9d. The ONU-1 is connected to two ports in the port group 2 of the splitting apparatus by using two fibers (the fiber a1-2 and a fiber a2-2), the ONU-2 is connected to two ports in the port group 3 of the splitting apparatus by using two fibers (the fiber a1-3 and a fiber a2-3), the ONU-3 is connected to two ports in the port group 4 of the splitting apparatus by using two fibers (the fiber a1-4 and a fiber a2-4), and the ONU-4 is connected to two ports in the port group 5 of the splitting apparatus by using two fibers (the fiber a1-5 and a fiber a2-5).

Based on a PON system shown in FIG. 9a or FIG. 9c, when the OLT-1 is faulty or the fiber a1-1 connected to the OLT-1 is faulty, the splitting apparatus may be quickly (for example, in 50 ms) switched the OLT-2 connected to the fiber a2-1, to ensure optical signal transmission; and when the OLT-1 is faulty or the fiber a1-1 connected to the OLT-1 is faulty, and the OLT-2 is faulty or the fiber a2-1 connected to the OLT-2 is faulty, one ONU may be replaced with an OLT, to ensure optical signal transmission between the OLT and other ONUs, and the other ONUs may perform communication based on the OLT.

Based on a PON system shown in FIG. 9b or FIG. 9d, when one PON port of the OLT-1 is faulty or the fiber a1-1 connected to the PON port is faulty, the splitting apparatus may be quickly (for example, in 50 ms) switched to another PON port of the OLT-1 or the fiber a2-1 connected to the PON port, to ensure optical signal transmission; and when the OLT-1 is faulty or the fibers (the fiber a1-1 and the fiber a2-1) connected to the OLT-1 are faulty, one ONU may be replaced with an OLT to ensure optical signal transmission between the OLT and other ONUs, and the other ONUs may perform communication based on the OLT.

In other embodiments, one or more ONUs may be replaced with a dual-mode ONU. The dual-mode ONU operates in an ONU mode when the ONU connected to the splitting apparatus can communicate with the OLT connected to the splitting apparatus, and operates in an OLT mode when the ONU connected to the splitting apparatus cannot communicate with the OLT connected to the splitting apparatus. The dual-mode ONU operating in the OLT mode may implement functions of a conventional OLT, and the dual-mode ONU operating in the ONU mode may implement functions of a conventional ONU. The dual-mode ONU operates only in one of the ONU mode and the OLT mode at one moment.

Figures 10, 11:
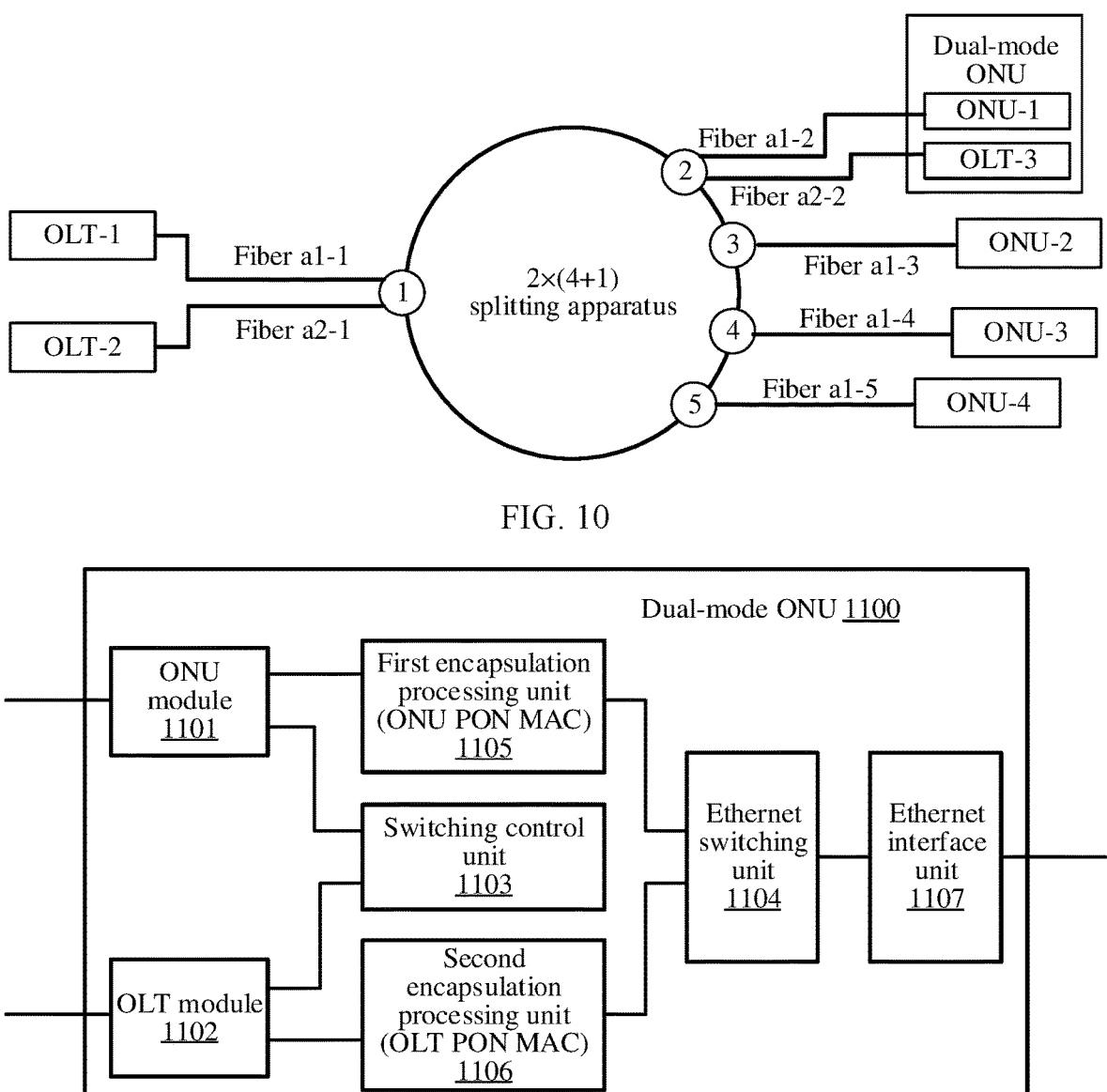
FIG. 10 is a schematic diagram of applying a 2×(4+1) splitting apparatus to PON networking according to another embodiment of this disclosure.
FIG. 11 is a schematic diagram of a structure of a dual-mode ONU according to an embodiment of this disclosure.

FIG. 10 is a schematic diagram of applying a 2×(4+1) splitting apparatus provided in an embodiment of this disclosure to PON networking. Different from FIG. 9a, in FIG. 10, the ONU-1 is replaced with a dual-mode ONU. One PON port of the dual-mode ONU is connected to one port in the port group 2 of the splitting apparatus by using the fiber a1-2, and the other PON port of the dual-mode ONU is connected to another port in the port group 2 of the splitting apparatus by using the fiber a2-2. When the dual-mode ONU operates in the ONU mode, a function of the ONU 1 may be implemented (in other words, the dual-mode ONU is equivalent to a conventional ONU-1). When the dual-mode ONU operates in the OLT mode, a function of a conventional OLT may be implemented (in other words, the dual-mode ONU is equivalent to a conventional OLT-3).

Certainly, one ONU in the PON networking shown in FIG. 9b, FIG. 9c, or FIG. 9d may be replaced with the dual-mode ONU. This is not limited in this embodiment of this disclosure.

It should be noted that a plurality of (that is, two or more) ONUs may be replaced with the dual-mode ONU. This is not limited in this embodiment of this disclosure.

Based on the PON system shown in FIG. 10, in a normal case, the dual-mode ONU (equivalent to the ONU-1) operating in the ONU mode, the ONU-2, the ONU-3, and the ONU-4 are connected to the OLT-1 and the OLT-2 in a TYPE B protection manner by using the splitting apparatus. Functions of the splitting apparatus in this case are basically the same as functions of a conventional splitter. In a normal case, light emission of an OLT-3 module of the dual-mode ONU is disabled, and only the ONU-1 operates normally.

When the OLT-1 is faulty or the fiber a1-1 connected to the OLT-1 is faulty, the splitting apparatus may be quickly (for example, in 50 ms) switched to the OLT-2 connected to the fiber a2-1, to ensure optical signal transmission. In this case, the dual-mode ONU operates in the ONU mode.

When the OLT-1 is faulty or the fiber a1-1 connected to the OLT-1 is faulty, and the OLT-2 is faulty or the fiber a2-1 connected to the OLT-2 is faulty, the dual-mode ONU, the ONU-2, the ONU-3, and the ONU-4 can form an ad hoc network. Specifically, light emission of an ONU-1 module of the dual-mode ONU is disabled, and an OLT-3 module operates; in other words, the dual-mode ONU switches to the OLT mode. In this case, the dual-mode ONU is used as an upstream OLT of the ONU-2, the ONU-3, and the ONU-4. An optical signal may be input from the dual-mode ONU (that is, equivalent to being input from the OLT-3), and output from the ONU-2, the ONU-3, and the ONU-4, or may be input from the ONU-2, the ONU-3, and the ONU-4, and output from the dual-mode ONU (that is, equivalent to being output from the OLT-3). The optical signal may be transmitted between the ONU-2, the ONU-3, and the ONU-4 by using the dual-mode ONU, so that the dual-mode ONU, the ONU-2, the ONU-3, and the ONU-4 form an ad hoc network to ensure optical signal transmission. In an ad hoc state of the dual-mode ONU, the ONU-2, the ONU-3, and the ONU-4, the dual-mode ONU replaces a location of the OLT, and is used as a transit node for communication between the ONU-2, the ONU-3, and the ONU-4. The dual-mode ONU has basically a same function as that of the conventional OLT.

After a link of the feeder fiber a1-1 or a2-1 is recovered, light emission of the OLT-3 module of the dual-mode ONU is disabled, and a normal operating mode of the ONU-1 is enabled; in other words, the dual-mode ONU switches to the ONU mode, and the system is recovered to a normal state.

FIG. 11 is a schematic diagram of a structure of a dual-mode ONU according to an embodiment of this disclosure.

As shown in the figure, a dual-mode ONU 1100 may include an ONU module 1101, an OLT module 1102, and a switching control unit 1103. Further, the dual-mode ONU 1100 may further include an Ethernet switching unit 1104, a first encapsulation processing unit 1105, a second encapsulation processing unit 1106, and an Ethernet interface unit 1107.

The ONU module 1101 may receive an optical signal of a first wavelength (a downlink wavelength, such as 1490 nm) and send an optical signal of a second wavelength (an uplink wavelength, such as 1310 nm), to implement an ONU function. The OLT module 1102 may send the optical signal of the first wavelength and receive the optical signal of the second wavelength, to implement an OLT function.

The ONU module 1101 is connected to one port in one group of ports of the splitting apparatus by using a fiber connected to a PON port of the ONU module 1101, and the OLT module 1102 is connected to another port in the same group of ports of the splitting apparatus by using a fiber connected to a PON port of the OLT module 1102. For example, in FIG. 10, the dual-mode ONU is connected to one group of ports of the splitting apparatus by using two fibers. Certainly, the ONU module and the OLT module in the dual-mode ONU may alternatively share one PON port, and are connected to one port of the splitting apparatus by using a single fiber.

The switching control unit 1103 may control switching of operating modes of the dual-mode ONU. Specifically, the switching control unit 1103 may disable light emission of the OLT module 1102, so that the dual-mode ONU 1100 operates in an ONU mode, or enables light emission of the OLT module 1102, so that the dual-mode ONU 1100 operates in an OLT mode. Switching of the operating mode of the dual-mode ONU may occur on the PON port of the ONU module 1101 and the PON port of the OLT module 1102. In a one-out-of-two switching manner, it can be ensured that only one of the ONU module 1101 and the OLT module 1102 emits light at any time, to prevent causing light pollution to communication between an OLT and an ONU connected to the splitting apparatus. A GPON is used as an example. Light pollution means that at least two optical signals are superposed in uplink light (a wavelength is 1310 nm) or downlink light (a wavelength is 1490 nm) at a same time.

When the dual-mode ONU 1100 operates in the ONU mode, if the switching control unit 1103 detects that a connection between the splitting apparatus and the optical line terminal OLT is interrupted, for example, detects that duration in which the ONU module 1101 is in a state with no light reception (for example, duration in which the ONU module does not receive the optical signal of the first wavelength) is greater than or equal to specified duration, it indicates that the ONU connected to the splitting apparatus cannot communicate with the OLT connected to the splitting apparatus, so that the dual-mode ONU 1100 switches to the OLT mode (for example, a light emitting module of the OLT module 1102 is enabled, and light emission of the ONU module 1101 is disabled).

Further, when light emission of the OLT module 1102 is enabled and light emission of the ONU module 1101 is disabled, light reception of the ONU module 1101 may be reserved. An objective of reserving light reception of the ONU module 1101 is that when the OLT (such as the OLT-1 or the OLT-2 in FIG. 10) recovers the connection to the splitting apparatus, the ONU module 1101 can receive an optical signal that is of the first wavelength and that is sent by the OLT 1 or the OLT 2. Due to a physical feature of the splitting apparatus, the optical signal that is of the first wavelength and that is sent by the OLT module 1102 of the dual-mode ONU 1100 cannot be received by the ONU module 1101. If the ONU module 1101 receives the optical signal of the first wavelength, it may be considered that the OLT recovers the connection.

The dual-mode ONU operates in the OLT mode in this case. Therefore, before the dual-mode ONU operating in the OLT mode detects that the OLT 1 or the OLT 2 has been recovered from a fault, light emission of the OLT module in the dual-mode ONU is superposed with a light emission signal of the OLT 1 or the OLT 2. For a common ONU, "light pollution" has been caused on the first wavelength, and due to the light pollution, the common ONU other than the dual-mode ONU cannot receive a normal downlink signal. Specifically, in a time period in which the OLT sends the optical signal of the first wavelength (a downlink wavelength, such as 1490 nm), the dual-mode ONU operating in the OLT mode also sends the optical signal of the first wavelength, and in this case, normal communication is interfered with.

Because the ONU module 1101 in the dual-mode ONU 1100 cannot receive light emitted by the OLT module 1102 in the dual-mode ONU 1100, the ONU module 1101 can always normally perceive and receive the optical signal that is of the first wavelength and that is sent by the OLT 1 or the OLT 2.

After the switching control unit 1103 in the dual-mode ONU 1100 receives the optical signal that is of the first wavelength and that is sent by the OLT 1 or the OLT 2, the dual-mode ONU 1100 switches from the OLT mode to the ONU mode (for example, disables light emission of the OLT module 1102 and enables light emission of the ONU module 1101).

When the dual-mode ONU is applied to PON networking, a group of ports of the splitting apparatus provided in this embodiment of this disclosure may be connected to an OLT (may be connected to two PON ports of one OLT by using two fibers, or may be connected to two OLTs by using two fibers, as shown in FIG. 10), another group of ports is connected to the dual-mode ONU, and a conventional ONU is connected to still another group of ports. The PON networking shown in FIG. 10 is used as an example. In a normal case, the OLT 1 or the OLT 2 sends the optical signal of the first wavelength, the ONU module in the dual-mode ONU can receive the optical signal of the first wavelength, and the dual-mode ONU is in the ONU operating mode. When the OLT 1 and the OLT 2 are disconnected from the splitting apparatus or both the two OLTs are faulty, the optical signal of the first wavelength cannot be sent. Consequently, the ONU module in the dual-mode ONU cannot receive the optical signal of the first wavelength in a relatively long time, and therefore, the dual-mode ONU switches to the OLT mode. In the OLT mode, the OLT module in the dual-mode ONU sends the optical signal of the first wavelength, so that a function of the OLT can be implemented; in other words, a conventional ONU in the PON networking can perform communication by using the dual-mode ONU operating in the OLT mode. After the OLT 1 or the OLT 2 recovers a connection to the splitting apparatus, the optical signal that is of the first wavelength and that is sent by the OLT 1 or the OLT 2 is received by the ONU module in the dual-mode ONU operating in the OLT mode. Therefore, the dual-mode ONU is triggered to switch to the ONU mode, to implement a function of the conventional ONU, and normal communication is recovered in the PON networking.

In the dual-mode ONU 1100, the first encapsulation processing unit 1105 is coupled between the ONU module 1101 and the Ethernet switching unit 1104. The first encapsulation processing unit may also be referred to as an ONU PON MAC unit, and is configured to: process a PON data frame from the ONU module 1101 into an Ethernet frame and send the Ethernet frame to the Ethernet switching unit 1104, or may process an Ethernet frame from the Ethernet switching unit 1104 into a PON data frame and send the PON data frame to the ONU module 1101. A GPON is used as an example. The ONU module 1101 and ONU PON MAC implement encapsulation and mapping of a GEM (G-PON Encapsulation Mode, GPON encapsulation mode) frame from an Ethernet to a PON, and encapsulation and mapping of a GEM frame of the PON to an Ethernet frame.

The second encapsulation processing unit 1106 is coupled between the OLT module 1102 and the Ethernet switching unit 1104; in other words, the OLT module 1102 is connected to the Ethernet switching unit 1104 by using the second encapsulation processing unit 1106. The second encapsulation processing unit 1106 may also be referred to as an OLT PON MAC unit. A function of the second encapsulation processing unit 1106 (OLT PON MAC) is similar to that of an uplink port of a common OLT. The second encapsulation processing unit 1106 may process a PON data frame from the OLT module 1102 into an Ethernet frame and send the Ethernet frame to the Ethernet switching unit 1104, and may also process an Ethernet frame from the Ethernet switching unit 1104 into a PON data frame and send the PON frame to the OLT module 1102. The GPON is used as an example. The OLT module 1102 and the ONU PON MAC implement encapsulation and mapping of a GEM frame from the Ethernet to the PON, and encapsulation and mapping of a GEM frame of the PON to an Ethernet frame.

The Ethernet interface unit 1107 is an Ethernet interface connected to a terminal device.

It should be noted that some units (such as the Ethernet switching unit 1104 or the switching control unit 1103) in the dual-mode ONU 1100 may be implemented in a software manner, may be implemented in a hardware manner, or may be implemented in a combination of software and hardware. This is not limited in this embodiment of this disclosure.

It should be further noted that the foregoing structure of the dual-mode ONU is only an example. Any dual-mode ONU that operates in the ONU mode when the ONU connected to the splitting apparatus can communicate with the OLT connected to the splitting apparatus and that operates in the OLT mode when the ONU connected to the splitting apparatus cannot communicate with the OLT connected to the splitting apparatus shall fall within the protection scope of this disclosure.

Based on the splitting apparatus provided in this embodiment of this disclosure and the PON networking formed by using the dual-mode ONU, disaster recovery can be implemented, to improve reliability.

In the splitting apparatus provided in this embodiment of this disclosure and the PON network formed by using the dual-mode ONU, when the dual-mode ONU connected to the splitting apparatus operates in the ONU mode, if it is detected that the connection between the splitting apparatus and the OLT is interrupted, the dual-mode ONU switches to the OLT mode.

After receiving an optical signal of a second wavelength (an uplink wavelength, such as 1310 nm) of the first ONU connected to the splitting apparatus, the dual-mode ONU operating in the OLT mode converts the optical signal of the second wavelength into the optical signal of the first wavelength (a downlink wavelength, such as 1490 nm), and sends the optical signal of the first wavelength to the splitting apparatus. The optical signal of the first wavelength is received by the second ONU connected to the splitting apparatus, so that communication between ONUs connected to the splitting apparatus is implemented based on the dual-mode ONU.

Specifically, after receiving the optical signal of the second wavelength from the first ONU connected to the splitting apparatus, the dual-mode ONU operating in the OLT mode demodulates the optical signal of the second wavelength into a first PON data frame, decapsulates the first PON data frame into an Ethernet frame, determines, based on a destination address of the Ethernet frame, that a target ONU of the first PON data frame is the second ONU, re-encapsulates the Ethernet frame into a second PON data frame that carries an identifier of the second ONU, modulates the second PON data frame into the optical signal of the first wavelength, and sends the optical signal of the first wavelength to the splitting apparatus. The optical signal of the first wavelength is received by the second ONU connected to the splitting apparatus, and is demodulated and decapsulated by the second ONU and then sent to a device connected to the second ONU.

The destination address of the Ethernet frame may be specifically a destination MAC address of the Ethernet frame. The identifier of the second ONU may be an LLID of the second ONU. In the foregoing procedure, after receiving the PON data frame from the first ONU, the dual-mode ONU operating in the OLT mode decapsulates the PON data frame into an Ethernet frame, obtains a destination MAC address in the Ethernet frame, searches a forwarding table based on the destination MAC address, obtains an LLID of a second ONU corresponding to the destination MAC address, re-encapsulates the Ethernet frame into a second PON data frame that carries the LLID of the second ONU, and sends the re-encapsulated second PON data frame to the splitting apparatus. After receiving the second PON data frame from the dual-mode ONU operating in the OLT mode, if the second ONU determines that the LLID carried in the second PON data frame is the same as an LLID of the second ONU, the second ONU decapsulates the PON data frame, and sends an Ethernet frame obtained through decapsulation to the device connected to the second ONU.

Further, after receiving the optical signal of the first wavelength, the ONU module in the dual-mode ONU operating in the OLT mode switches to the ONU mode.

A disaster recovery function of PON networking in this embodiment of this disclosure is described below with reference to two specific scenarios.

Scenario 1

Figure 12:
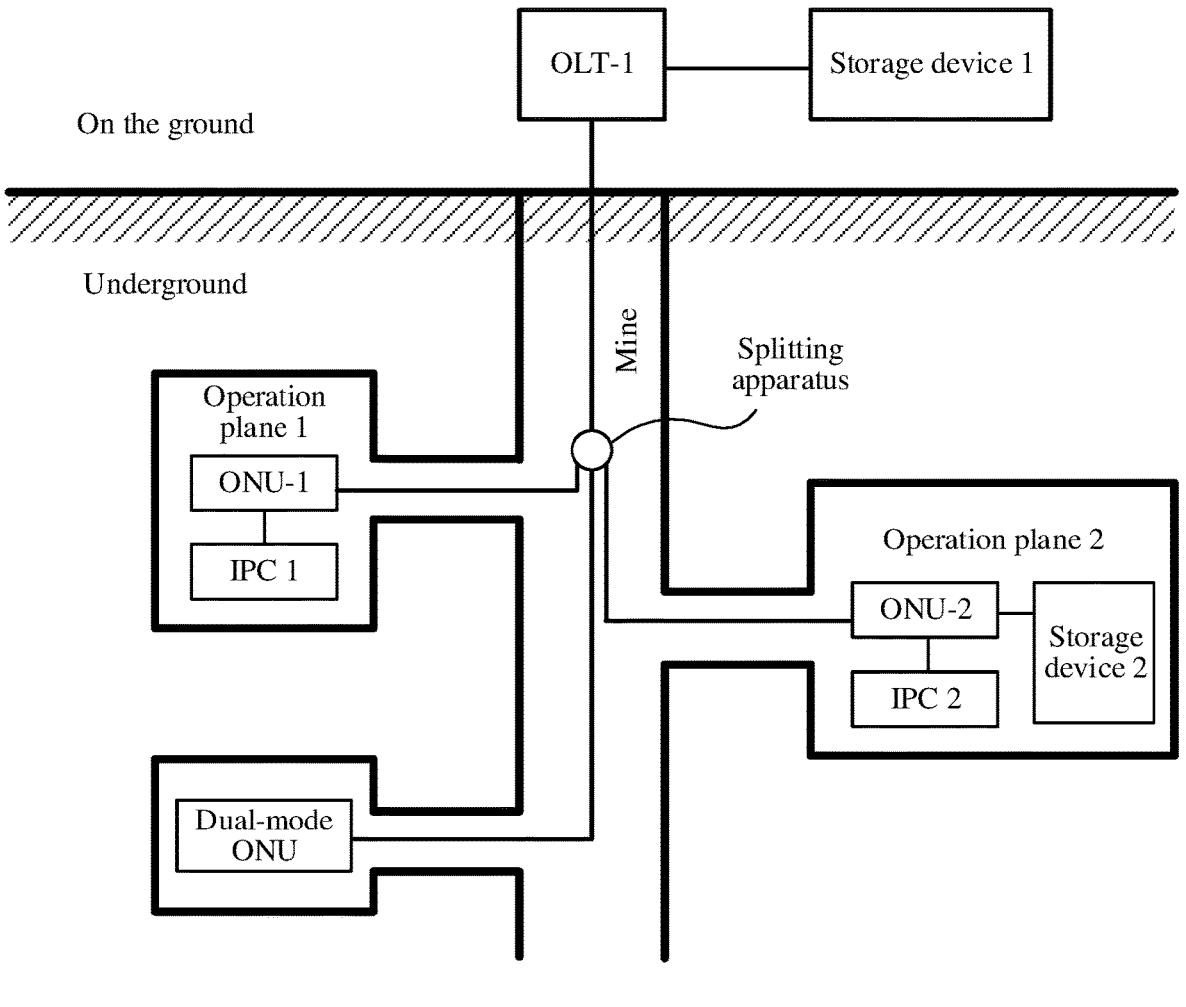
FIG. 12 and FIG. 13 are respectively schematic diagrams of application of a mine scenario according to an embodiment of this disclosure.

The scenario is a mine application scenario, and a schematic diagram of the scenario is shown in FIG. 12. In a mine scenario, the OLT-1 is located above a mine and placed on the ground, and the ONU-1, the ONU-2, and the dual-mode ONU are placed in the mine and located underground. The OLT-1 is connected to each ONU by using the splitting apparatus provided in this embodiment of this disclosure. The ONU-1, the ONU-2, and the dual-mode ONU are connected to a PON port of the OLT-1 by using a first-level splitting apparatus.

Generally, there are a plurality of operation planes in the mine, and at least one camera (such as an IPC, where the IPC is an English abbreviation of an IP camera, that is, a network camera) is disposed on some operation planes to collect audio and video data of a corresponding operation plane. Based on a requirement for safe production in the mine, audio and video data collected by the camera (such as the IPC) needs to be uploaded to a storage device 1 above the mine for storage, and also needs to be stored in a storage device 2 disposed in the mine.

In a normal case, after being encapsulated (a destination address is an address of the storage device 1), audio and video data collected by an IPC 1 on an operation plane 1 may be sent to the OLT-1 by using the ONU-1, and after being encapsulated (a destination address is the address of the storage device 1), audio and video data collected by an IPC 2 on an operation plane 2 may be sent to the OLT-1 by using the ONU-2 and sent by the OLT-1 to the storage device 1 for storage. After being encapsulated (a destination address is an address of the device 2), the audio and video data collected by the IPC 1 on the operation plane 1 may be sent to the OLT-1 by using the ONU-1, and is sent by the OLT-1 to the ONU-2 on the operation plane 2, and is sent by the ONU-2 to the storage device 2 for storage. The audio and video data collected by the IPC 2 on the operation plane 2 may be sent by the ONU-2 to the storage device 2 for storage.

When an accident occurs, a feeder fiber of the splitting apparatus is interrupted, and a connection between the OLT-1 and the splitting apparatus is disconnected. After detecting that the connection between the OLT-1 and the splitting apparatus is disconnected, the dual-mode ONU disposed in the mine switches to the OLT mode. In this case, the dual-mode ONU operating in the OLT mode, the ONU-1, and the ONU-2 form an ad hoc network.

After receiving an optical signal of a second wavelength (an uplink wavelength, such as 1310 nm) from the ONU-1, the dual-mode ONU operating in the OLT mode demodulates the optical signal of the second wavelength into audio and video data, that is, a PON data frame, decapsulates the PON data frame into an Ethernet frame, obtains a destination MAC address (the address of the storage device 2) in the Ethernet frame, searches a forwarding table based on the MAC address, obtains an LLID of the ONU-2 corresponding to the MAC address, re-encapsulates the Ethernet frame into a PON data frame that carries the LLID of the ONU-2, modulates the re-encapsulated PON data frame into an optical signal of a first wavelength (a downlink wavelength, such as 1490 nm), and sends the optical signal of the first wavelength to the splitting apparatus. The optical signal of the first wavelength is sent to the ONU-2 by using the splitting apparatus, and after receiving the optical signal of the first wavelength from the dual-mode ONU, the ONU-2 demodulates the optical signal of the first wavelength into a PON data frame, and if the ONU-2 determines that an LLID carried in the PON data frame is the same as an LLID of the ONU-2, the ONU-2 decapsulates the PON data frame, and sends an Ethernet frame obtained through decapsulation to the storage device 2 connected to the ONU-2. Therefore, audio and video data collected by a camera (such as an IPC) on each operation plane is stored in a storage device disposed in the mine, so that a requirement for safe production in the mine is met.

Scenario 2

Figure 13:
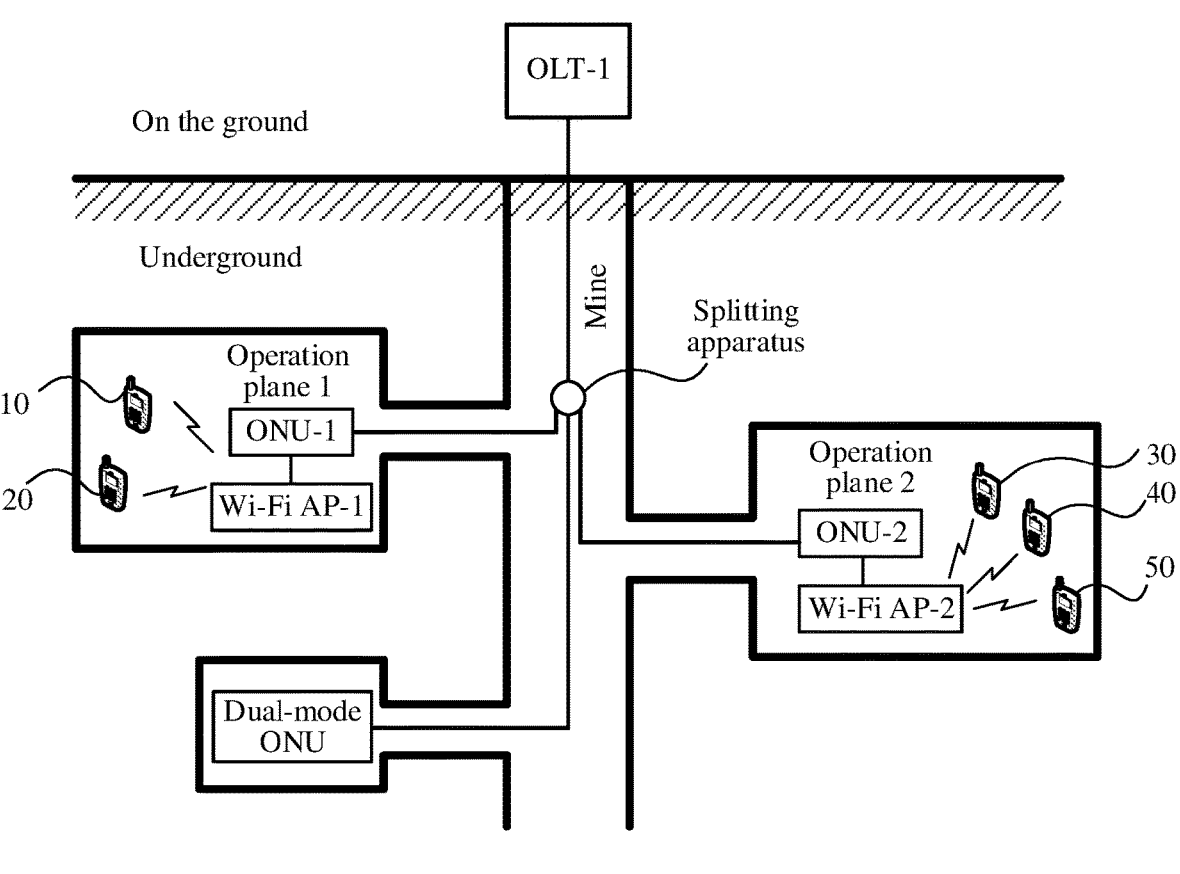

The scenario is a mine application scenario, and a schematic diagram of the scenario is shown in FIG. 13. In a mine scenario, the OLT-1 is located above a mine and placed on the ground, and the ONU-1, the ONU-2, and the dual-mode ONU are placed in the mine and located underground. The OLT-1 is connected to each ONU by using the splitting apparatus provided in this embodiment of this disclosure. The ONU-1, the ONU-2, and the dual-mode ONU are connected to a PON port of the OLT-1 by using a first-level splitting apparatus.

Generally, there are a plurality of operation planes in the mine, and a wireless local area network access device (such as a Wi-Fi AP, that is, a Wi-Fi access point) is disposed on some operation planes. The wireless local area network access device is connected to an ONU, and a handheld wireless communication device of a worker on the operation plane may be connected the wireless local area network access device, to implement communication inside the operation plane and communication with a worker on another operation plane. For example, workers on different operation planes may use a handheld device to make a call, perform voice communication, or perform video communication.

A wireless local area network (WLAN) is a network architecture in which computer devices are interconnected by using a wireless communication technology to implement mutual communication and share resources.

In a normal case, an information exchange process of communication of the wireless local area network is similar to the scenario 1; to be specific, information of handheld wireless communication devices on different operation planes may be exchanged based on an exchange function of the OLT-1.

When an accident occurs, a feeder fiber of the splitting apparatus is interrupted, and a connection between the OLT-1 and the splitting apparatus is disconnected. After detecting that the connection between the OLT-1 and the splitting apparatus is disconnected, the dual-mode ONU disposed in the mine switches to the OLT mode. In this case, the dual-mode ONU operating in the OLT mode, the ONU-1, and the ONU-2 form an ad hoc network.

In the ad hoc network, data sent by handheld wireless communication devices (10 and 20) on the operation plane 1 may be sent to the ONU-1 by using a Wi-Fi AP-1. The ONU-1 sends the data to the dual-mode ONU operating in the OLT mode. The dual-mode ONU operating in the OLT mode may send the data to an ONU-2 on the operation plane 2, and the ONU-2 sends the data to handheld wireless communication devices (30, 40, and 50) on the operation plane 2 by using a Wi-Fi AP-2. A communication process is similar to that in the scenario 1, so that miners on the operation planes can keep communication by using handheld wireless communication devices; in other words, a requirement for safe production in the mine is met.

The foregoing splitting apparatus of an optical bus structure with peer-to-peer topologies provided in this embodiment of this disclosure may be configured to resolve a problem that after a feeder fiber in a PON communication technology is interrupted, PON ports connected to branch fibers cannot form an ad hoc network, and a possibility of direct communication between ONUs is formed on a physical path.

In the foregoing splitting apparatus of the optical bus structure with peer-to-peer topologies provided in this embodiment of this disclosure, implementations are simple, a passive characteristic is maintained, an extra-low voltage room is not required during deployment, power supply is not required, engineering implementation is convenient, and higher price in terms of costs and maintenance is avoided in a wavelength reflection manner or in a manner of reflecting a wavelength in a liquid crystal on silicon (liquid crystal on silicon, LCoS) technology in a wavelength selective switch (WSS) manner.

The splitting apparatus provided in this embodiment may be further applied to optical switching networking.

When the splitting apparatus provided in this embodiment is applied to optical switching networking, at least two switching devices may be connected to the splitting apparatus provided in this embodiment of this disclosure, and each switching device may be connected to one group of ports in the M groups of ports of the splitting apparatus by using a fiber. The switching device may send and receive an optical signal, and wavelengths of optical signals in a transmit direction and a receive direction may be configured. For example, the switching device may include a router or a switch configured with an optical module. A wavelength of the transmitted and/or received optical signal may be allowed by disposing the optical module on the switching device, so that the switching device can transmit and/or receive an optical signal of a specified wavelength.

In some embodiments, optical signal transmission in both the transmit direction and the receive direction of the switching device is implemented by configuring wavelengths of optical signals in a receive direction and a transmit direction of the optical module. Specifically, if wavelength paired setting (to be specific, a wavelength of an optical signal sent by one switching device is equal to a wavelength of an optical signal received by another switching device) of transmitted and received optical signals is allowed by optical modules of two switching devices, optical signal transmission between the two switching devices may be implemented. In other embodiments, optical signal transmission in the transmit direction of the switching device is implemented by configuring the wavelength of the optical signal in the transmit direction of the optical module, and the wavelength of the optical signal in the receive direction may be implemented by disposing a filter; to be specific, the filter is disposed, so that the filter receives only an optical signal of a specific wavelength, and filters out an optical signal of another wavelength.

Optionally, the optical module may be disposed on an upstream port of the switching device, and the upstream port is a port used when the switching device is cascaded.

Figure 14:
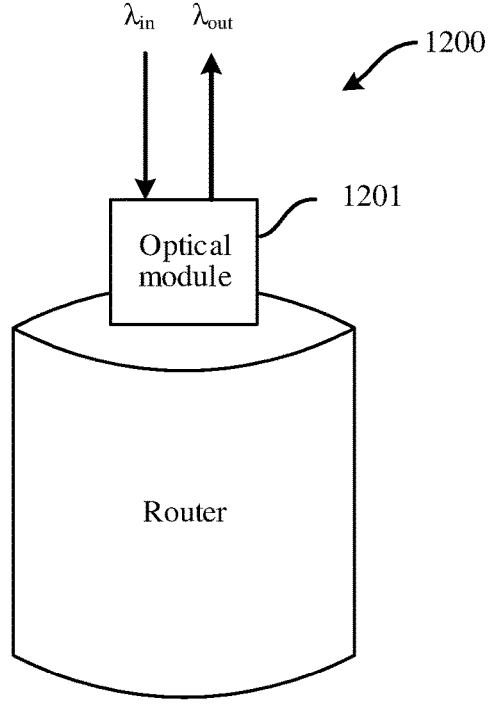
FIG. 14 is a schematic diagram of a router configured with an optical module according to an embodiment of this disclosure.

For example, the switching device is a router. FIG. 14 is a schematic diagram of a router configured with an optical module. As shown in the figure, a router 1200 is configured with an optical module 1201, and a wavelength λout of an optical signal in a receive direction of the optical module 1201 and a wavelength λout of an optical signal in a transmit direction is configurable or tunable.

Optionally, the optical module configured on the switching device may be a small form pluggable (SFP) optical module.

Optionally, the optical module configured on the switching device may be an optical module whose wavelengths in a receive direction and a transmit direction are selectable in dense wavelength division multiplexing (DWDM) C-band wavelengths. A DWDM light source is disposed on the switching device. The light source provides wavelengths of all DWDM C-bands. The C-band has 80 selectable wavelengths with a 100-GHz interval in DWDM. To be specific, in a range from 190.1 THz (a corresponding wavelength is 15770.3 nm) to 198.0 THz (a corresponding wavelength is 15141.0 nm), there are a total of 80 selectable wavelengths, and an interval between adjacent wavelengths is 0.1 THz (that is, 100 GHz). During configuration of wavelengths of optical signals in a receive direction and a transmit direction, an optical module that uses DWDM and whose C-band wavelength is selectable may select a wavelength from a DWDM light source pool for configuration. Relatively short time is required, and relatively high configuration efficiency can be implemented.

Figure 15:
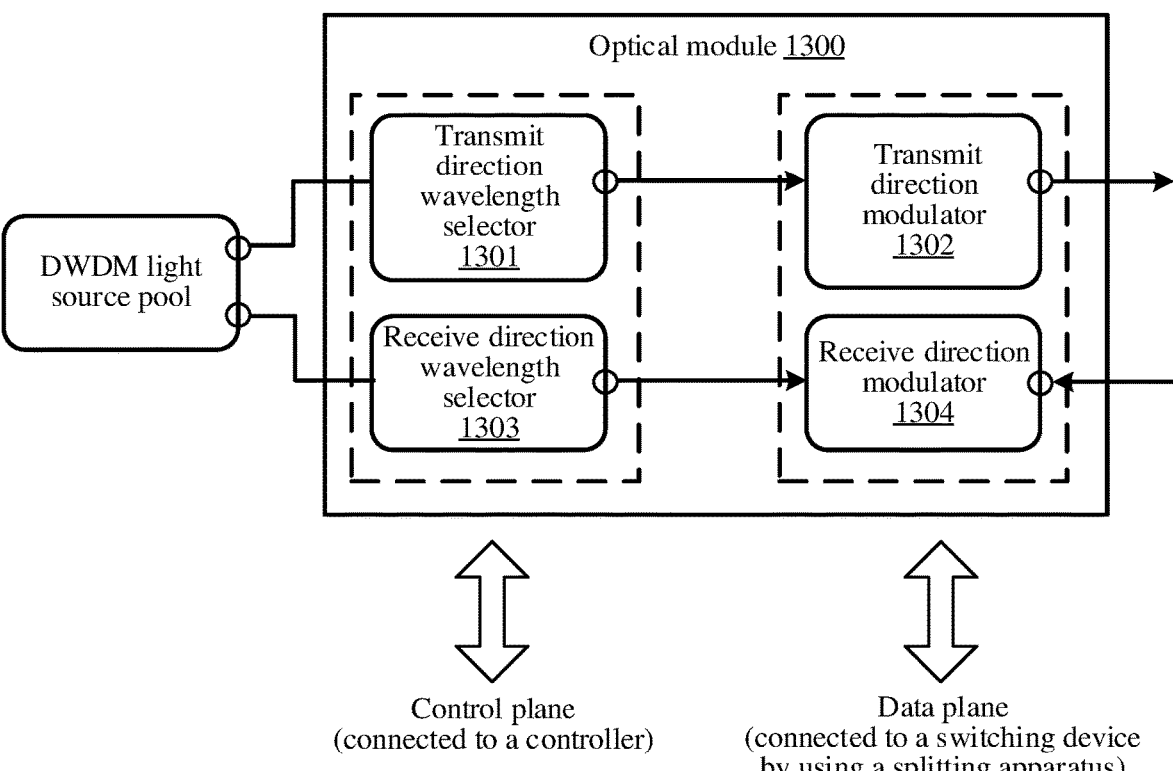
FIG. 15 is a schematic diagram of a structure of an optical module according to an embodiment of this disclosure.

FIG. 15 is a schematic diagram of a structure of an optical module according to an embodiment. As shown in the figure, an optical module 1300 may include a transmit direction wavelength selector 1301, a transmit direction modulator 1302, a receive direction wavelength selector 1303, and a receive direction modulator 1304. The transmit direction wavelength selector 1301 and the receive direction wavelength selector 1303 are separately connected to a controller, work on a control plane, and may receive an indication command (the indication command may be used to indicate a wavelength of an optical signal in a transmit direction and/or a wavelength of an optical signal in a receive direction) that is from the control plane and that is sent by the controller. The transmit direction modulator 1302 and the receive direction modulator 1304 may be connected to a splitting apparatus by using a fiber and work on a data plane, and are configured to modulate and transmit an optical signal.

Optionally, the transmit direction wavelength selector 1301 is configured to select the wavelength of the optical signal in the transmit direction from a DWDM light source pool according to instructions of the controller. The receive direction wavelength selector 1303 is configured to select the wavelength of the optical signal in the receive direction from the DWDM light source pool according to the instruction of the controller. The transmit direction modulator 1302 is configured to modulate and send the optical signal based on the wavelength that is in the transmit direction and that is selected by the transmit direction wavelength selector 1301, and the receive direction modulator 1304 is configured to receive and demodulate the received optical signal based on the wavelength that is in the receive direction and that is selected by the receive direction wavelength selector 1303.

The optical module configured on the switching device may alternatively be another type of optical module, for example, may be a tunable optical module. This is not limited in this embodiment.

Figure 16:
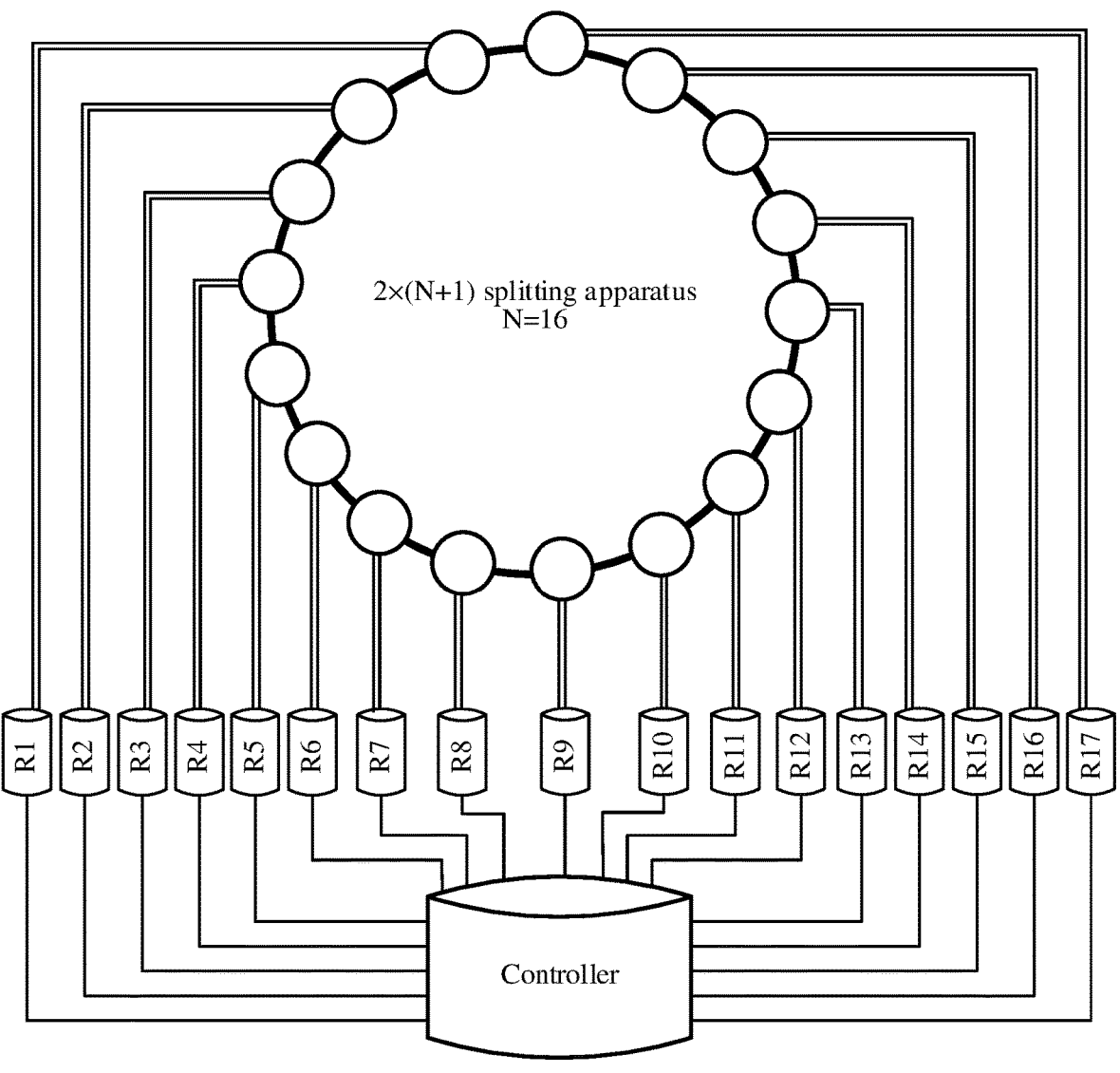
FIG. 16 is a schematic diagram of networking of an optical switching network implemented based on a 2×(16+1) splitting apparatus according to an embodiment of this disclosure.

FIG. 16 is a schematic diagram of networking of an optical switching network implemented based on a 2×(16+1)

splitting apparatus. The 2×(16+1) splitting apparatus includes (1+16) splitting elements (that is, N=16), and each splitting element has 16 branch ends (that is, 16 outputs) and two feeder ends (that is, two inputs). For a connection manner of each splitting element, refer to the foregoing embodiments.

Upstream ports of switching devices R1, R2, and R3 to R17 are separately connected to the 2×(16+1) splitting apparatus by using an optical module, to implement an equivalent one-hop fiber direct transmission channel between switching devices Ri (i=1, 2, 3, . . . , 17). The switching device may include a router, a switch, an optical transmission device, a storage device, and the like. This is not limited in this embodiment of this disclosure.

A controller is connected to each switching device, and is configured to allocate a wavelength of an optical signal in a receive direction and a wavelength of an optical signal in a transmit direction to a switching device (such as a first switching device and a second switching device) with a communication requirement, so that an optical signal sent by the first switching device is received by the second switching device, and an optical signal sent by the second switching device is received by the first switching device. In this way, a communication channel is established between different switching devices.

As shown in FIG. 16, for example, the switching device uses an optical module with a selectable C-band wavelength of DWDM. If the switching device R1 needs to communicate with the switching device R17, the switching device R1 sends a request message to the controller, to request to communicate with the switching device R17. After receiving the request message, the controller selects a wavelength from a C-band light source pool of DWDM, and configures wavelengths of optical signals in receive directions of upstream ports of the switching device R1 and the switching device R17 and wavelengths of optical signals in transmit directions for the switching device R1 and the switching device R17, so that the wavelength of the optical signal in the transmit direction of the switching device R1 is the only used wavelength in the 2×(16+1) splitting apparatus, and the wavelength of the optical signal in the transmit direction of the switching device R17 is also the only used wavelength in the 2×(16+1) splitting apparatus. In addition, the wavelength in the receive direction of the switching device R17 is equal to the wavelength in the transmit direction of the switching device R1, and the wavelength in the receive direction of the switching device R1 is equal to the wavelength in the transmit direction of the switching device R17. For example, $P1-\lambda_{in}$=190.1 THz and $P1-\lambda_{out}$=190.2 THz (a frequency is used to identify a wavelength herein to simplify descriptions) are selected for an SFP operating wavelength of an upstream port P1 of the switching device R1, and $P17-\lambda_{in}$=190.2 THz and $P17-\lambda_{out}$=190.1 THz are selected for an SFP operating wavelength of an upstream port P17 of the switching device R17.

FIG. 16 shows only an example of an optical network system architecture in which the splitting apparatus provided in this embodiment of this disclosure is used for networking. It should be noted that a 2×(16+1) splitting apparatus may be replaced with a splitting apparatus of another structure provided in this embodiment. For example, the 2×(16+1) splitting apparatus may be replaced with a 1×(16+1) splitting apparatus. Cases are not listed one by one herein.

Based on the splitting apparatus of an optical bus structure with peer-to-peer topologies provided in this embodiment, an interconnection solution for wavelength selection-based switching devices (such as a router) may be implemented.

Compared with a conventional switching device interconnection solution implemented based on an IP layer, in this embodiment of this disclosure, such wavelength-level switching is independent of a protocol, can meet various direct interconnections based on an optical communication signal, and is characterized by a low delay and high bandwidth.

Based on a same concept as the foregoing method embodiments, an embodiment further provides a computer-readable storage medium, and some instructions are stored on the computer-readable storage medium. When the instructions are invoked and executed by a computer, the computer may be enabled to complete the methods involved in the foregoing method embodiments and any possible design of the method embodiments. In this embodiment of this disclosure, the computer-readable storage medium is not limited. For example, the computer-readable storage medium may be a RAM (random-access memory) or a ROM (read-only memory).

Based on a same concept as the foregoing method embodiments, this disclosure further provides a computer program product. When being invoked and executed by a computer, the computer program product may complete the methods involved in the foregoing method embodiments and any possible design of the method embodiments.

Based on a same concept as the foregoing method embodiments, this disclosure further provides a chip. The chip may include a processor and an interface circuit, and is configured to complete the methods involved in the foregoing method embodiments and any possible implementation of the method embodiments. "Coupling" means a direct or indirect combination of two components. The combination may be fixed or mobile. The combination may allow fluid, electricity, an electrical signal, or another type of signal to be communicated between the two components.

Terms used in the following embodiments are merely intended to describe particular embodiments, but are not intended to limit this disclosure. Terms "one", "a", "the", "the foregoing", "this", and "the one" of singular forms used in this specification and the appended claims of this disclosure are also intended to include expressions such as "one or more", unless otherwise specified in the context clearly. It should be further understood that, in embodiments of this disclosure, "one or more" means one, two, or more, and "and/or" describes an association relationship of associated objects and indicates that three relationships may exist. For example, A and/or B may represent a case in which only A exists, a case in which both A and B exist, and a case in which only B exists, where A and B may be singular numbers or complex numbers. The character "/" usually indicates an "or" relationship between associated objects.

Reference to "one embodiment", "some embodiments", or the like described in this specification means that specific features, structures, or features described with reference to the embodiment are included in one or more embodiments of this disclosure. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, a relational term such as first or second is used to distinguish one entity from another, without limiting any actual relationship and sequence between these entities.

What is claimed is:

1. A dual-mode optical network unit (ONU), comprising:
an ONU module configured to receive an optical signal of a first wavelength and to send an optical signal of a second wavelength;
an optical line terminal (OLT) module configured to send the optical signal of the first wavelength and receive the optical signal of the second wavelength; and
a switching control unit configured to control the dual-mode ONU to operate in one of an ONU mode and an OLT mode, wherein when the dual-mode ONU operates in the ONU mode, when the duration in which the ONU module does not receive the optical signal of the first wavelength is greater than or equal to specified duration, light emission of the OLT module is enabled, light emission of the ONU module is disabled, and light reception of the ONU module is maintained so that the dual-mode ONU switches to the OLT mode.

2. The dual-mode ONU according to claim 1, wherein the switching control unit is configured to:
when the dual-mode ONU operates in the OLT mode, if the ONU module receives the optical signal of the first wavelength, disable light emission of the OLT module and enable light emission of the ONU module, so that the dual-mode ONU switches to the ONU mode.

3. The dual-mode ONU according to claim 1, wherein the dual-mode ONU further comprises:
an Ethernet switching unit;
a first encapsulation processing unit coupled between the ONU module and the Ethernet switching unit, the first encapsulation processing unit being configured to process at least one of a passive optical network (PON) data frame from the ONU module into an Ethernet frame and send the Ethernet frame to the Ethernet switching unit or process an Ethernet frame from the Ethernet switching unit into a PON data frame and send the PON data frame to the ONU module; and
a second encapsulation processing unit coupled between the OLT module and the Ethernet switching unit, the second encapsulation processing unit being configured to process at least one of a passive optical network PON data frame from the OLT module into an Ethernet frame and send the Ethernet frame to the Ethernet switching unit or process an Ethernet frame from the Ethernet switching unit into a PON data frame and send the PON data frame to the OLT module.

4. An optical network system-based communication method, applied to a splitting apparatus and a dual-mode optical network unit ONU, the method comprising:
when the dual-mode ONU connected to the splitting apparatus operates in an ONU mode, when duration of time in which an optical signal of a first wavelength is not received is greater than or equal to specified duration, switching to an optical line terminal OLT mode; and after the dual-mode ONU operating in the OLT mode receives an optical signal of a second wavelength from a first ONU connected to the splitting apparatus, converting the optical signal of the second wavelength into the optical signal of the first wavelength and sending the optical signal of the first wavelength to the splitting apparatus so that the optical signal of the first wavelength is received by a second ONU connected to the splitting apparatus.

5. The method according to claim 4, further comprising:
when the ONU module of the dual-mode ONU operating in the OLT mode receives the optical signal of the first wavelength, switching to the ONU mode, wherein the optical signal of the first wavelength is an optical signal that is of the first wavelength and that is sent, after a connection between an OLT and the splitting apparatus is recovered, by the OLT within a time period in which the OLT sends the optical signal of the first wavelength.

6. The method according to claim 4, wherein the first ONU is connected to an audio and video collection device, and the second ONU is connected to a storage device;
the dual-mode ONU operating in the OLT mode receives the optical signal that is of the second wavelength and that is sent by the first ONU, the optical signal of the second wavelength carries audio and video data sent to the storage device, and the audio and video data is collected by the audio and video collection device connected to the first ONU;
the optical signal of the second wavelength is converted into the optical signal of the first wavelength; and
the optical signal of the first wavelength is sent to the splitting apparatus, so that the optical signal of the first wavelength is received by the second ONU, and the second ONU sends the audio and video data carried by the optical signal of the first wavelength to the storage device.

7. The method according to claim 4, wherein the first ONU is connected to a first wireless local area network access device, and the second ONU is connected to a second wireless local area network access device;
the dual-mode ONU operating in the OLT mode receives the optical signal that is of the second wavelength and that is sent by the first ONU, the optical signal of the second wavelength carries communication data sent to a terminal connected to the second wireless local area network access device, and the communication data is sent by a terminal connected to the first wireless local area network access device connected to the first ONU;
the optical signal of the second wavelength is converted into the optical signal of the first wavelength; and
the optical signal of the first wavelength is sent to the splitting apparatus, so that the optical signal of the first wavelength is received by the second ONU, and the second ONU sends the communication data carried by the optical signal of the first wavelength to the terminal connected to the second wireless local area network access device.

8. A dual-mode optical network unit (ONU), comprising:
an ONU module configured to receive an optical signal of a first wavelength and to send an optical signal of a second wavelength;
an optical line terminal (OLT) module configured to send the optical signal of the first wavelength and receive the optical signal of the second wavelength;
a switching control unit configured to control the dual-mode ONU to operate in one of an ONU mode and an OLT mode, wherein when the dual-mode ONU operates in the ONU mode, when the duration in which the ONU module does not receive the optical signal of the first wavelength is greater than or equal to specified duration, light emission of the OLT module is enabled, light emission of the ONU module is disabled, and light reception of the ONU module is maintained so that the dual-mode ONU switches to the OLT mode;

an Ethernet switching unit;

a first encapsulation processing unit coupled between the ONU module and the Ethernet switching unit, the first encapsulation processing unit being configured to process at least one of a passive optical network (PON) data frame from the ONU module into an Ethernet frame and send the Ethernet frame to the Ethernet switching unit or process an Ethernet frame from the Ethernet switching unit into a PON data frame and send the PON data frame to the ONU module; and a second encapsulation processing unit coupled between the OLT module and the Ethernet switching unit, the second encapsulation processing unit being configured to process at least one of a passive optical network PON data frame from the OLT module into an Ethernet frame and send the Ethernet frame to the Ethernet switching unit or process an Ethernet frame from the Ethernet switching unit into a PON data frame and send the PON data frame to the OLT module.

9. The dual-mode ONU according to claim 8, wherein the switching control unit is configured to:

when the dual-mode ONU operates in the OLT mode, if the ONU module receives the optical signal of the first wavelength, disable light emission of the OLT module and enable light emission of the ONU module, so that the dual-mode ONU switches to the ONU mode.

* * * * *